(12) United States Patent
Yamamoto et al.

(10) Patent No.: US 10,530,057 B2
(45) Date of Patent: Jan. 7, 2020

(54) ANTENNA DEVICE AND ELECTRONIC APPLIANCE

(71) Applicant: Murata Manufacturing Co., Ltd., Nagaokakyo-shi, Kyoto-fu (JP)

(72) Inventors: Masayoshi Yamamoto, Nagaokakyo (JP); Nobuyuki Tenno, Nagaokakyo (JP)

(73) Assignee: MURATA MANUFACTURING, CO., LTD., Kyoto (JP)

( * ) Notice: Subject to any disclaimer, the term of this patent is extended or adjusted under 35 U.S.C. 154(b) by 0 days.

(21) Appl. No.: 16/057,843

(22) Filed: Aug. 8, 2018

(65) Prior Publication Data

US 2018/0351256 A1 Dec. 6, 2018

Related U.S. Application Data

(63) Continuation of application No. PCT/JP2017/034402, filed on Sep. 25, 2017.

(30) Foreign Application Priority Data

Sep. 26, 2016 (JP) .................................. 2016-186559
Oct. 21, 2016 (JP) .................................. 2016-207267
Jan. 13, 2017 (WO) .................... PCT/JP2017/000961

(51) Int. Cl.
*H01Q 7/00* (2006.01)
*H01Q 1/38* (2006.01)
(Continued)

(52) U.S. Cl.
CPC ................. *H01Q 7/00* (2013.01); *H01Q 1/38* (2013.01); *H01Q 1/42* (2013.01); *H01Q 1/44* (2013.01); *H01Q 1/48* (2013.01)

(58) Field of Classification Search
CPC .. H01Q 7/00; H01Q 1/38; H01Q 1/42; H01Q 1/44; H01Q 1/48
(Continued)

(56) References Cited

U.S. PATENT DOCUMENTS

2013/0181876 A1* 7/2013 Miura ................ G06K 7/10316
343/788
2013/0307746 A1* 11/2013 Nakano ................ H01Q 1/2225
343/850
(Continued)

FOREIGN PATENT DOCUMENTS

JP 2013-168756 A 8/2013
JP 2013-168894 A 8/2013
(Continued)

OTHER PUBLICATIONS

Official Communication issued in Japanese Patent Application No. 2017-211463, dated Sep. 18, 2018.
(Continued)

*Primary Examiner* — Huedung X Mancuso
(74) *Attorney, Agent, or Firm* — Keating & Bennett, LLP

(57) ABSTRACT

An antenna device includes a first planar conductor, a second planar conductor that opposes the first planar conductor in a parallel or substantially parallel arrangement, and a coil element with a winding axis that extends in a direction parallel or substantially parallel to the first planar conductor and the second planar conductor, and includes a first coil opening end and a second coil opening end that opposes the first coil opening end. The first planar conductor includes a conductor outer edge, and a conductor opening including a portion that is continuous with the conductor outer edge. At least a portion of the conductor opening is positioned inside a conductor overlapping region. The first coil opening end of the coil element does not overlap the second planar conductor, and the second coil opening end of the coil element
(Continued)

overlaps the conductor opening and the second planar conductor.

20 Claims, 22 Drawing Sheets

(51) Int. Cl.
    *H01Q 1/44*         (2006.01)
    *H01Q 1/48*         (2006.01)
    *H01Q 1/42*         (2006.01)

(58) Field of Classification Search
    USPC .......................................................... 343/720
    See application file for complete search history.

(56) References Cited

U.S. PATENT DOCUMENTS

| | | |
|---|---|---|
| 2014/0203981 A1 | 7/2014 | Nakano et al. |
| 2014/0203992 A1 | 7/2014 | Nakano et al. |
| 2014/0300522 A1* | 10/2014 | Kato ................. H01Q 7/08 343/788 |
| 2015/0325918 A1 | 11/2015 | Ito |
| 2016/0276749 A1* | 9/2016 | Komachi ............. H01Q 1/38 |
| 2017/0005391 A1 | 1/2017 | Tenno |
| 2017/0040663 A1 | 2/2017 | Ito |
| 2017/0229778 A1 | 8/2017 | Tenno |
| 2018/0013202 A1 | 1/2018 | Ito et al. |
| 2018/0204104 A1* | 7/2018 | Naruse ................. G06K 19/07 |

FOREIGN PATENT DOCUMENTS

| | | |
|---|---|---|
| JP | 2014-075775 A | 4/2014 |
| WO | 2014/003163 A1 | 1/2014 |
| WO | 2014/003164 A1 | 1/2014 |
| WO | 2015/098794 A1 | 7/2015 |
| WO | 2015/147132 A1 | 10/2015 |
| WO | 2015/166834 A1 | 11/2015 |
| WO | 2016/121501 A1 | 8/2016 |
| WO | 2016/143724 A1 | 9/2016 |

OTHER PUBLICATIONS

Official Communication issued in International Patent Application No. PCT/JP2017/000961, dated Apr. 4, 2017.

Official Communication issued in International Patent Application No. PCT/JP2017/034402, dated Nov. 21, 2017.

* cited by examiner

FIG. 11B          <COMPARATIVE EXAMPLE>

ANTENNA DEVICE AND ELECTRONIC APPLIANCE

CROSS REFERENCE TO RELATED APPLICATIONS

This application claims the benefit of priority to Japanese Patent Application No. 2016-186559 filed on Sep. 26, 2016, Japanese Patent Application No. 2016-207267 filed on Oct. 21, 2016, and PCT Application No. PCT/JP2017/000961 filed on Jan. 13, 2017 and is a Continuation Application of PCT Application No. PCT/JP2017/034402 filed on Sep. 25, 2017. The entire contents of these applications are hereby incorporated herein by reference.

BACKGROUND OF THE INVENTION

1. Field of the Invention

The present invention relates to an antenna device including a coil element, and to an electronic appliance including the antenna device.

2. Description of the Related Art

For example, Japanese Unexamined Patent Application Publication No. 2014-75775 discloses an antenna device in which a planar conductor of an electronic appliance is used as a portion of a radiating element. The antenna device is configured such that a coil antenna, which is connected to a feeder circuit, couples with a loop formed by the planar conductor, and the planar conductor acts as an antenna radiating body.

A large portion of a casing of an electronic appliance, such as a mobile terminal device or an information processing device, is frequently formed of a metal member in order to increase the mechanical strength of the casing and to improve freedom of design. Consequently, a coil antenna mounted on a circuit board is often covered by a metal portion of the casing.

In an antenna device in which a planar conductor, such as a ground conductor pattern, formed on a circuit board of an electronic appliance is used as a radiating body, when a coil antenna mounted on a circuit board is covered by a metal portion of the casing, magnetic flux that passes through the coil antenna does not flow in a large loop to outside the casing and the communication characteristics are severely degraded. This phenomenon was discovered by the inventors of the present invention described and claimed in this application.

SUMMARY OF THE INVENTION

Preferred embodiments of the present invention provide antenna devices that each reduce or prevent a reduction in antenna characteristics despite having a structure in which a coil antenna is covered by a planar conductor defining a portion of a radiating body or by another planar conductor, and provide electronic appliances including the antenna devices.

An antenna device according to a preferred embodiment of the present invention includes a first planar conductor; a second planar conductor that opposes the first planar conductor in a parallel or substantially parallel arrangement; and a coil antenna with a winding axis that extends in a direction parallel or substantially parallel to the first planar conductor and the second planar conductor, and includes a first coil opening end and a second coil opening end that opposes the first coil opening end.

The first planar conductor includes a conductor outer edge, and a conductor opening including a portion that is continuous with the conductor outer edge, at least a portion of the conductor opening is positioned inside a conductor overlapping region in which the first planar conductor and the second planar conductor overlap in a plan view of the first planar conductor, the first coil opening end of the coil antenna does not overlap the second planar conductor in a plan view of the first planar conductor, and the second coil opening end of the coil antenna overlaps the conductor opening and the second planar conductor in a plan view of the first planar conductor.

With this configuration, magnetic flux that passes through the coil antenna is not obstructed by the second planar conductor, flows in a large loop, and couples with the communication partner antenna. In the case in which the second planar conductor is an electrically conductive portion of a casing, the magnetic flux that passes through the coil antenna flows in a large loop to outside the casing, and couples with the communication partner antenna. As a result, the degree of coupling with the communication partner antenna is increased and excellent communication characteristics are obtained.

An antenna device according to a preferred embodiment of the present invention preferably further includes a line conductor portion that is connected to two points on an inner edge of the conductor opening; and a capacitor that defines a loop-shaped current path together with the first planar conductor and the line conductor portion; and in which the coil antenna magnetically couples with the loop-shaped current path.

With this structure, a resonant circuit is defined by the inductance of the loop-shaped current path and the capacitance of the capacitor, the resonant circuit resonates at the frequency of a communication signal, and as a result, the coupling coefficient between the coil antenna and the resonant circuit is increased. In addition, a path along which a resonant current flows defines and functions as a radiating element, and the antenna characteristics are improved.

An electronic appliance according to a preferred embodiment of the present invention includes an antenna device according to a preferred embodiment of the present invention; and a circuit board including a ground conductor pattern; the first planar conductor being the ground conductor pattern.

With this configuration, the ground conductor pattern of the electronic appliance also defines and functions as the first planar conductor of the antenna device, and therefore, there is no need to separately provide the first planar conductor, and a reduction in the size of the electronic appliance and/or an increase in the gain of the antenna device is facilitated.

An electronic appliance according to a preferred embodiment of the present invention includes an antenna device according to a preferred embodiment of the present invention; and a casing including an electrically conductive portion; the second planar conductor being defined by the electrically conductive portion of the casing.

With this configuration, the electrically conductive portion of the casing of the electronic appliance also defines and functions as the second planar conductor of the antenna device, and therefore, there is no need to separately provide the second planar conductor, and a reduction in the size of the electronic appliance and/or an increase in the gain of the antenna device is facilitated.

An electronic appliance according to a preferred embodiment of the present invention includes an antenna device according to a preferred embodiment of the present invention; and a display panel including a shield layer; the second planar conductor being defined by the shield layer.

With this configuration, the shield layer of the display panel of the electronic appliance also defines and functions as the second planar conductor of the antenna device, and therefore, there is no need to separately provide the second planar conductor, and a reduction in the size of the electronic appliance and/or an increase in the gain of the antenna device is facilitated.

According to preferred embodiments of the present invention, antenna devices are obtained that each reduce or prevent a reduction in antenna characteristics despite having a structure in which a coil antenna is covered by a planar conductor used as a portion of a radiating body or by another planar conductor, and electronic appliances are obtained that each include an antenna device according to a preferred embodiment of the present invention.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11B is a sectional view schematically illustrating magnetic flux that passes through the coil element 20 of the antenna device 301Y of the comparative example and the communication partner antenna 500.

DETAILED DESCRIPTION OF THE PREFERRED EMBODIMENTS

Figure 1A:
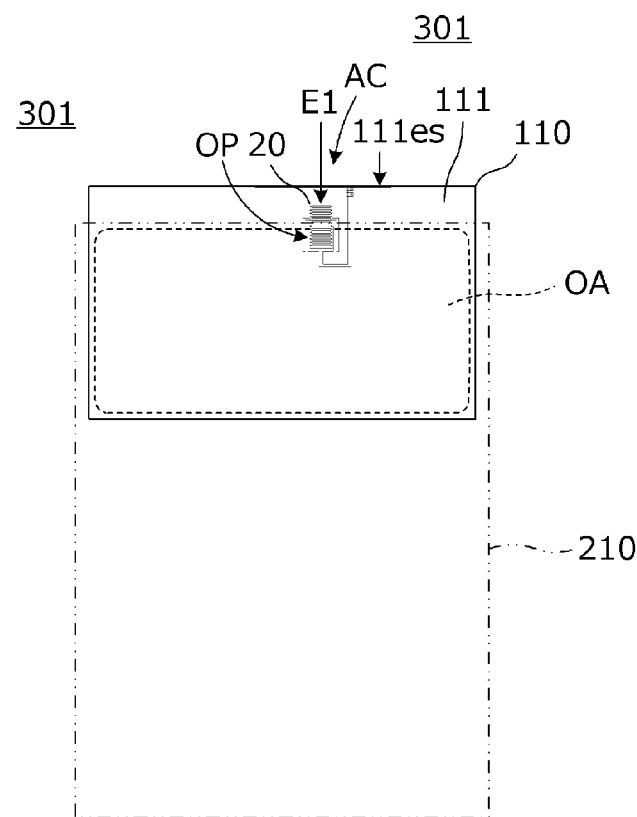
FIG. 1A is a plan view of an antenna device 301 according to a first preferred embodiment of the present invention.

Hereafter, preferred embodiments of the present invention will be described with reference to the drawings. Identical portions are denoted by identical symbols in the drawings. Taking explanation of important points or ease of understanding into account, the preferred embodiments are described in a separate manner for the sake of convenience, but portions of the configurations illustrated in the different preferred embodiments may be substituted for one another or combined with each other. In the second preferred embodiment and preferred embodiments thereafter, description of matters common to the first preferred embodiment is omitted and only the differences are described. In particular, the same or similar advantageous effects resulting from the same or similar configurations are not repeatedly described in the individual preferred embodiments.

First Preferred Embodiment

Figure 1B:
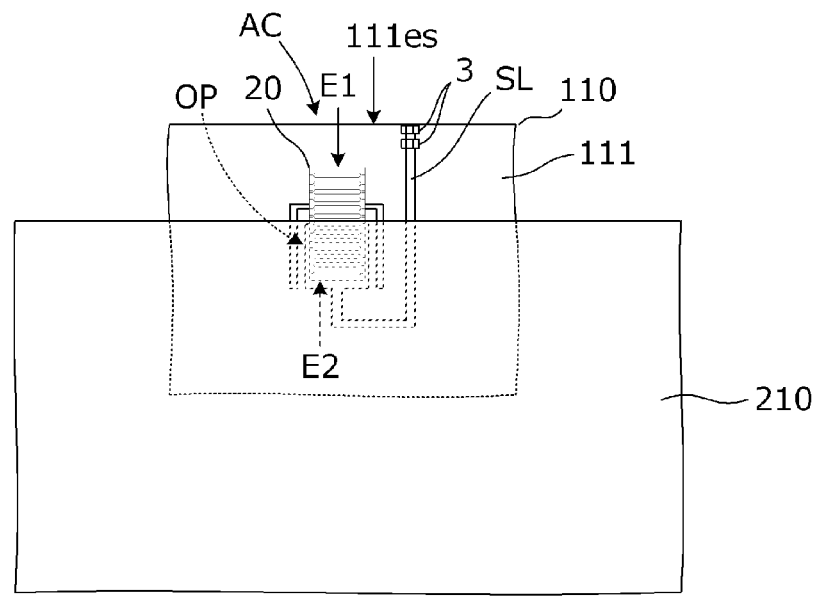
FIG. 1B is a plan view of a coil element arrangement portion AC of the antenna device 301.
Figure 2:
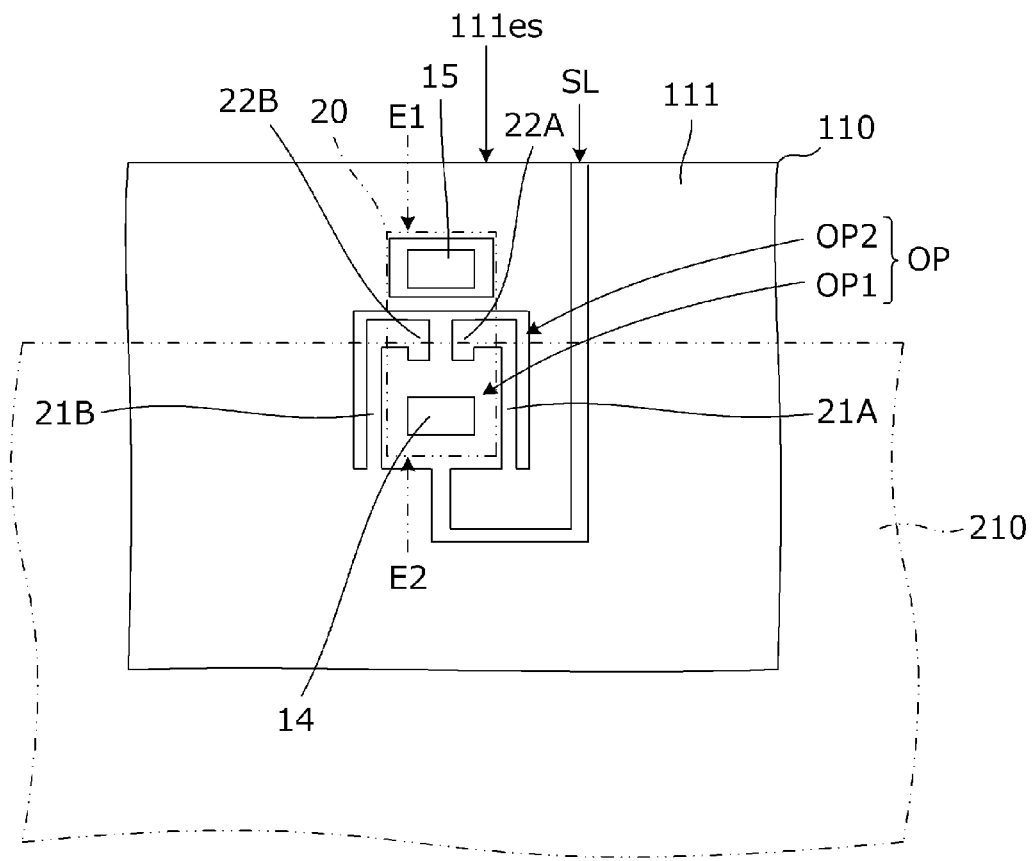
FIG. 2 is a plan view of the coil element arrangement portion prior to mounting of a coil element 20.

FIG. 1A is a plan view of an antenna device 301 according to a first preferred embodiment of the present invention, and FIG. 1B is a plan view of a coil element arrangement portion AC of the antenna device 301. FIG. 2 is a plan view of the coil element arrangement portion prior to mounting of a coil element 20 and capacitors 3.

The antenna device 301 includes a first planar conductor 111, a second planar conductor 210 that opposes the first planar conductor 111 in a parallel or substantially parallel arrangement, and the coil element 20.

As illustrated in FIG. 2, the first planar conductor 111 includes a first conductor opening OP1, a second conductor opening OP2, a conductor outer edge 111es, and a slit SL that connects the conductor opening OP and the conductor outer edge 111es to each other.

In the present preferred embodiment, the first planar conductor 111 is preferably a ground conductor pattern that is provided on a circuit board 110. The second planar conductor 210 is preferably a metal portion of a casing, for example.

Line conductor portions 21A and 21B, which are connected to two points on an inner edge of the conductor opening OP, are provided on the circuit board 110. The line conductor portions 21A and 21B extend along the boundary between the first conductor opening OP1 and the second conductor opening OP2. In other words, the line conductor portions 21A and 21B partition the conductor opening OP into the first conductor opening OP1 and the second conductor opening OP2.

In addition, coil element connection pads 14 and 15 and auxiliary coil connection pads 22A and 22B, to which the coil element 20 is connected, are provided on the circuit board 110. A feeder circuit, which is connected to the coil element connection pads 14 and 15, is provided on the circuit board 110.

The coil element 20 has a winding axis that extends in a direction parallel or substantially parallel to the first planar conductor 111 and the second planar conductor 210, and includes a first coil opening end E1, and a second coil opening end E2, which opposes the first coil opening end E1. The coil element 20 includes a coil conductor of a coil antenna that is wound in a helical shape around the winding axis, and the first coil opening end E1 of the coil element 20 and the second coil opening end E2 of the coil element 20 face each other with the coil conductor interposed therebetween. In this example, the winding axis of the coil antenna of the coil element 20 is parallel to the first planar conductor 111 and the second planar conductor 210, but the term "parallel" is not limited to meaning only completely parallel. It is sufficient that the winding axis be substantially parallel to or have a component that is parallel to the first planar conductor 111 and the second planar conductor 210. "Substantially parallel to" means that the winding axis of the coil antenna of the coil element 20 defines an angle in the range of about 0° to about 45° with the first planar conductor 111 and the second planar conductor 210.

A portion of the conductor opening OP is positioned inside a conductor overlapping region OA in which the first planar conductor 111 and the second planar conductor 210 overlap in a plan view of the first planar conductor 111. In addition, the first coil opening end E1 of the coil element 20 does not overlap the second planar conductor 210 in a plan view of the first planar conductor 111, and the second coil opening end E2 of the coil element 20 overlaps the conductor opening OP and the second planar conductor 210 in a plan view of the first planar conductor 111. Furthermore, the first coil opening end E1 of the coil element 20 is positioned outside the conductor overlapping region OA, and the second coil opening end E2 of the coil element 20 is positioned inside the conductor overlapping region OA.

The first coil opening end E1 of the coil element 20 is close to the conductor outer edge 111es in a region outside the conductor overlapping region OA. In other words, the first coil opening end E1 is closer to the conductor outer edge 111es in a region outside the conductor overlapping region OA than the second coil opening end E2.

One end of the slit SL, which is continuous with the conductor opening OP, is inside the conductor overlapping region OA. In the present preferred embodiment, the other end of the slit SL is continuous with the conductor outer edge 111es outside the conductor overlapping region OA. For this reason, the slit SL is bent in an intermediate portion thereof.

As illustrated in FIG. 1B, the capacitors 3 straddle (connect) the slit SL. In this example, two capacitors 3 are preferably mounted at positions at which the slit SL opens to the conductor outer edge 111es. The capacitors 3 are not restricted to these positions and may instead be connected midway along the slit.

Figure 3:
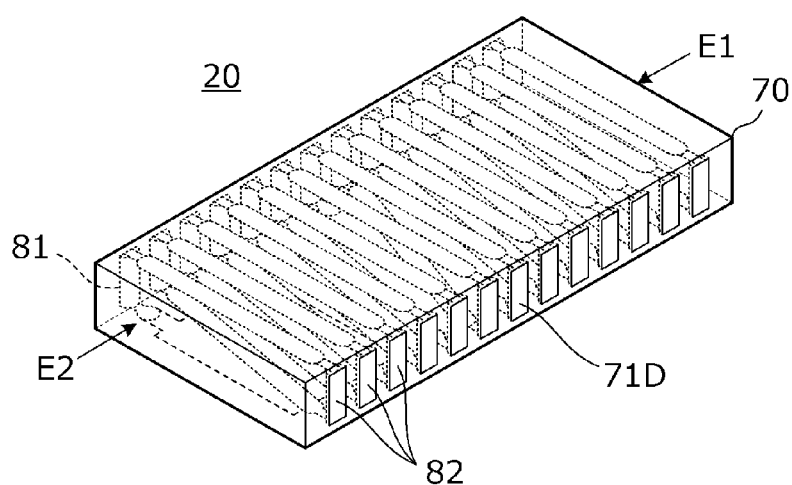
FIG. 3 is a perspective view of the coil element 20.
Figure 4:
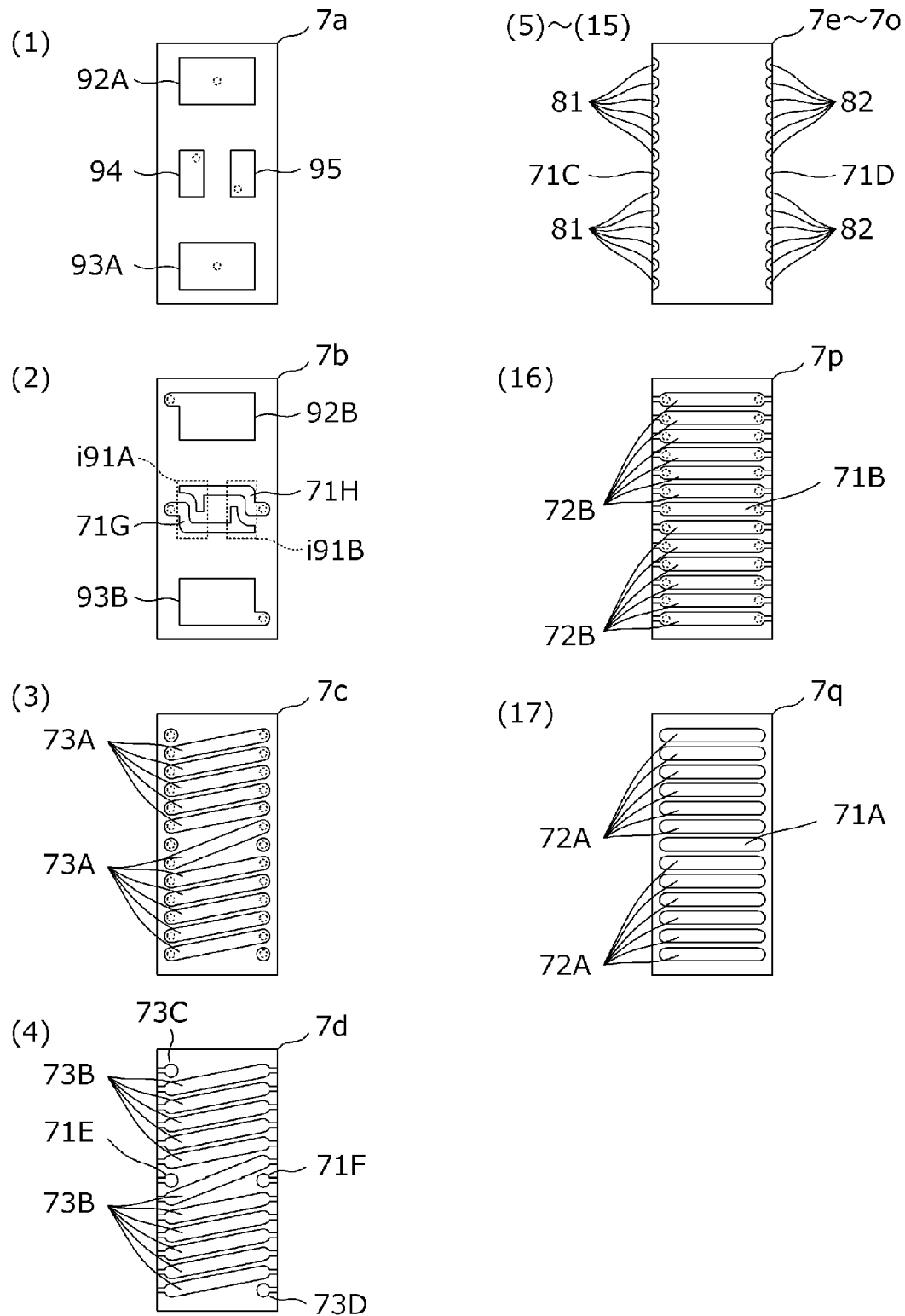
FIG. 4 is an exploded plan view illustrating electrode patterns and other elements of the substrate layers of a multilayer substrate 70 of the coil element 20.
Figure 5:
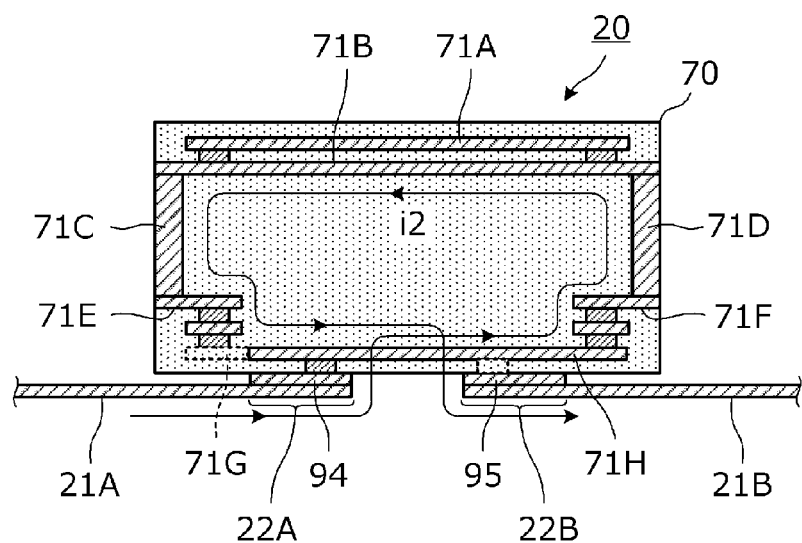
FIG. 5 is a sectional view illustrating the path of a current that flows in an auxiliary conductor provided inside the coil element 20.

Next, the structure of the coil element 20 will be described in detail. FIG. 3 is a perspective view of the coil element 20. FIG. 4 is an exploded plan view illustrating electrode patterns and other elements of the substrate layers of a multilayer substrate 70 of the coil element 20. FIG. 5 is a sectional view illustrating the path of a current that flows in an auxiliary conductor provided inside the coil element 20.

The coil element 20 includes an auxiliary conductor, which is connected in series with the line conductor portions 21A and 21B, and a helical-shaped coil antenna, which extends along a square cylinder, in and/or on a rectangular or substantially rectangular parallelepiped-shaped multilayer substrate 70.

Two terminals 92A and 93A to be connected to the coil element connection pads 14 and 15 illustrated in FIG. 2, and two terminals 94 and 95 to be connected to the auxiliary coil connection pads 22A and 22B, are provided on a bottom surface (mounting surface) of the coil element 20.

In the multilayer substrate 70, a plurality of substrate layers 7a to 7q, as illustrated in part (1) to (17) of FIG. 4, are stacked on top of one another in this order. Part (1) of FIG. 4 illustrates the lowermost layer and part (17) of FIG. 4 illustrates the uppermost layer. The bottom surfaces of the substrate layers 7a to 7q are respectively illustrated in parts (1) to (17) of FIG. 4, and the bottom surface of the substrate layer 7a is a mounting surface of the multilayer body 70.

Preferably, the substrate layers 7a, 7b, 7c, 7p, and 7q are rectangular or substantially rectangular parallelepiped-shaped non-magnetic layers, and are made of a non-magnetic ferrite, for example. Preferably, the substrate layers 7d to 7o are rectangular or substantially rectangular parallelepiped-shaped magnetic layers, and are made of a magnetic ferrite, for example. In other words, the multilayer body 70 has a configuration in which the magnetic substrate layers 7d to 7o are sandwiched between the non-magnetic substrate layers 7a, 7b, 7c, 7p, and 7q. The substrate layers 7a to 7q do not necessarily have to be magnetic layers or non-magnetic layers, and it is sufficient for the substrate layers 7a to 7q to be insulator layers. In addition, the term "non-magnetic layer" refers to a layer having a lower magnetic permeability than a magnetic layer, and such a non-magnetic layer does not necessarily have to be made of a non-magnetic material, and may instead be made of a magnetic material having a relative magnetic permeability of greater than or equal to 1 and having a lower relative magnetic permeability than a magnetic layer.

The terminals 92A and 93A and the terminals 94 and 95 are provided on the bottom surface of the substrate layer 7a illustrated in part (1) of FIG. 4.

Outer connection conductors 92B and 93B and line conductors 71G and 71H are provided on the bottom surface of the substrate layer 7b illustrated in part (2) of FIG. 4. The outer connection conductors 92B and 93B and the terminals 92A and 93A are connected to each other via respective interlayer connection conductors. The line conductor 71G is connected to the terminal 95 via an interlayer connection conductor, and the line conductor 71H is connected to the terminal 94 via an interlayer connection conductor.

A plurality of line conductors 73A are provided on the bottom surface of the substrate layer 7c illustrated in part (3) of FIG. 4. A plurality of line conductors 73B and line conductors 71E and 71F are provided on the bottom surface of the substrate layer 7d illustrated in part (4) of FIG. 4. The plurality of line conductors 73A and line conductors 73B are connected in parallel with one another via interlayer connection conductors.

A plurality of end surface conductors 81 and a plurality of end surface conductors 82 are provided on the substrate layers 7e to 7o illustrated in parts (5) to (15) of FIG. 4.

A plurality of line conductors 72B and one line conductor 71B are provided on the bottom surface of the substrate layer 7p illustrated in part (16) of FIG. 4. A plurality of line conductors 72A and one line conductor 71A are provided on the bottom surface of the substrate layer 7q illustrated in part (17) of FIG. 4. The plurality of line conductors 72A and line conductors 72B are connected in parallel with one another via interlayer connection conductors. In addition, the line conductor 71A and the line conductor 71B are connected in parallel with each other via interlayer connection conductors.

The plurality of line conductors 73B are sequentially connected in series with the plurality of line conductors 72B via the end surface conductors 81 and 82. In addition, the line conductors 71E and 71F are connected to the line conductor 71B via end surface conductors 71C and 71D.

A coil antenna preferably having an approximately twelve turn rectangular or substantially rectangular helical shape, for example, is defined by the line conductors 72A, 72B, 73A, and 73B and the end surface conductors 81 and 82.

In addition, an auxiliary conductor preferably having an approximately one turn rectangular loop shape, for example, is defined by the line conductors 71A, 71B, 71E, 71F, 71G, and 71H and the end surface conductors 71C and 71D.

In FIG. 5, the path of a current i2 that flows in the auxiliary conductor is illustrated. For example, in the case in which the current flows from the auxiliary coil connection pad 22A in the direction toward the auxiliary coil connection pad 22B, the current flows along the following path: auxiliary coil connection pad 22A→terminal 94→line conductor 71H→line conductor 71F→end surface conductor 71D→line conductors (71B, 71A) →end surface conductor 71C→line conductor 71E→line conductor 71G→terminal 95→auxiliary coil connection pad 22B. Thus, in addition to the coil antenna, the coil element 20 includes an auxiliary conductor in the center or approximate center of the coil antenna in the winding axis direction.

Figure 6:
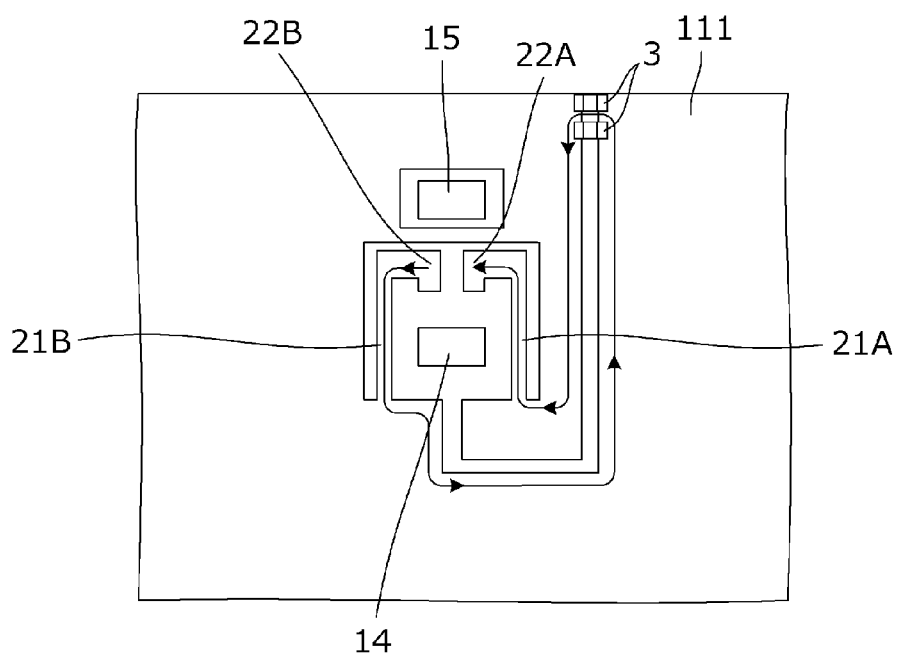
FIG. 6 is a diagram illustrating the path of a current that flows in a first planar conductor 111.

FIG. 6 is a diagram illustrating the path of a current that flows in the first planar conductor 111. As illustrated in the figure, a loop-shaped current path is defined by the auxiliary conductor of the coil element 20, the first planar conductor 111, the line conductor portions 21A and 21B, and the capacitors 3.

In the present preferred embodiment, since the auxiliary conductor inside the coil element 20 is a portion of the loop-shaped current path, the loop-shaped current path and the coil conductor of the coil element 20 are closer to each other than if the auxiliary conductor were not provided in the coil element 20. Therefore, the coupling between the loop-shaped current path and the coil antenna is strengthened. In addition, variations in the degree of coupling between the coil antenna and a loop-shaped conductor arising from variations in the mounting position of the coil element 20 are reduced.

Figure 7:
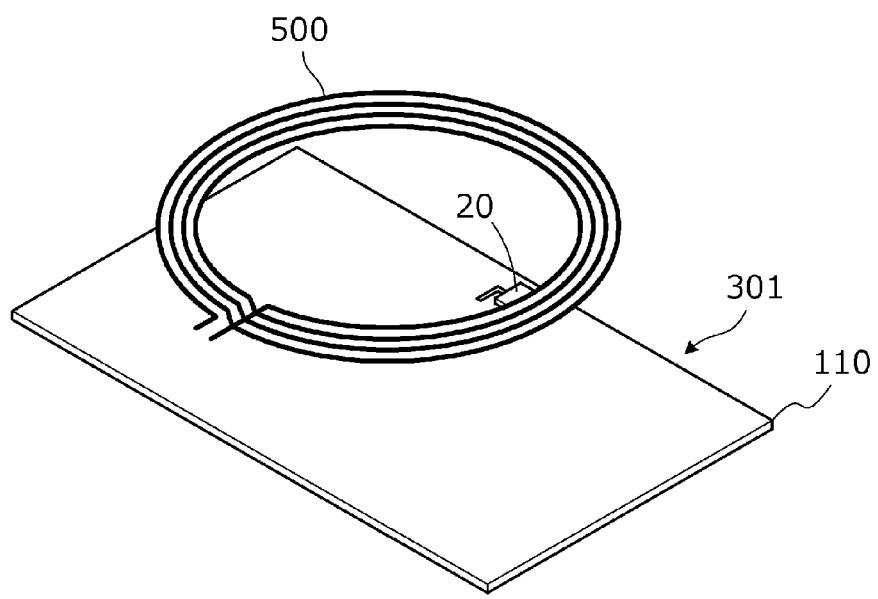
FIG. 7 is a perspective view illustrating the positional relationship between the antenna device 301 and a communication partner antenna 500.
Figure 8:
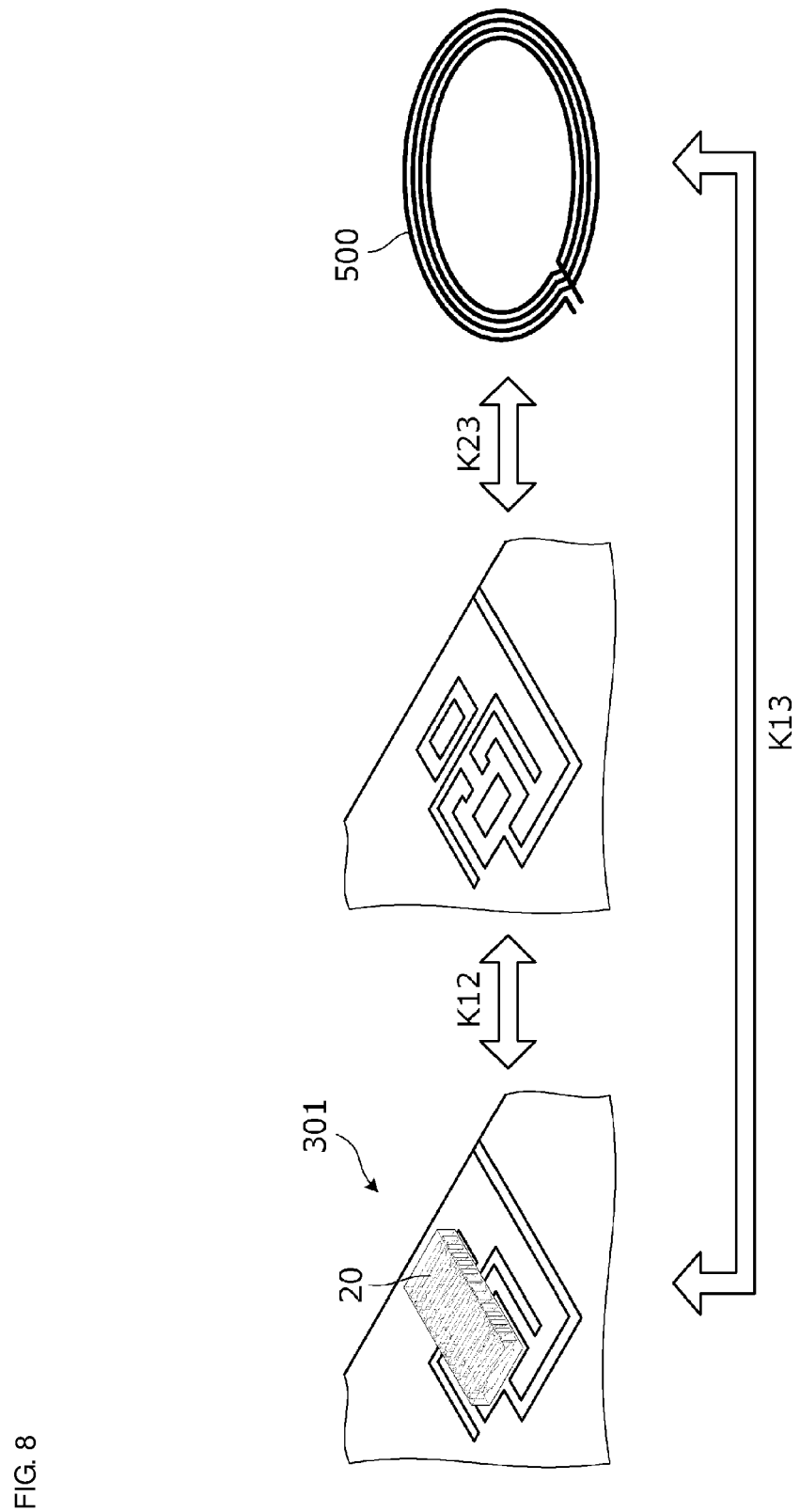
FIG. 8 is a diagram illustrating coupling between the antenna device 301 and the communication partner antenna 500.

FIG. 7 is a perspective view illustrating the positional relationship between the antenna device 301 of the present preferred embodiment and a communication partner antenna 500. In addition, FIG. 8 is a diagram illustrating the coupling between the antenna device 301 and the communication partner antenna 500. In FIG. 8, the coil antenna of the coil element 20 and the loop-shaped current path are coupled with each other with a coupling coefficient k12, and the loop-shaped current path and the communication partner antenna 500 are coupled with each other with a coupling coefficient k23. In addition, the coil antenna of the coil element 20 and the communication partner antenna 500 are coupled with each other with a coupling coefficient k13. Therefore, the effect of the coupling coefficient k23 is added and the coupling with the communication partner antenna 500 is increased compared to an antenna device in which the coil antenna is merely arranged on an edge portion of the first planar conductor 111 of the circuit board.

Figure 9:
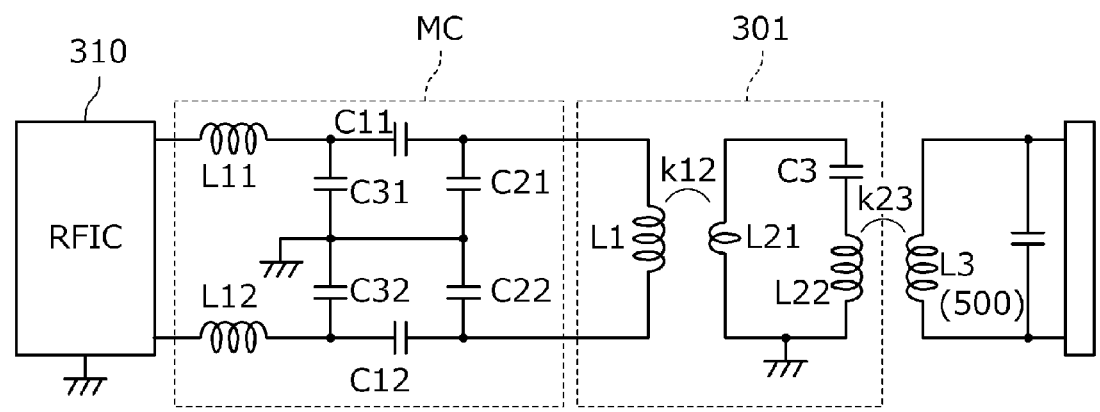
FIG. 9 is a circuit diagram of the antenna device 301 and circuits connected to the antenna device 301.

FIG. 9 is a circuit diagram of the antenna device 301 of the present preferred embodiment and circuits connected to the antenna device 301. Here, the coil antenna inside the coil element 20 of the antenna device 301 is represented by an inductor L1. In addition, L21 denotes an inductor defined by the auxiliary conductor inside the coil element 20, and L22 denotes an inductor defined by the loop-shaped current path. A capacitor C3 corresponds to the capacitors 3 included in the loop-shaped current path. In addition, the communication partner antenna 500 is represented by an inductor L3.

In the example illustrated in FIG. 9, a matching network MC is defined by inductors L11 and L12 and capacitors C11, C12, C21, C22, C31, and C32.

The inductors L21 and L22 and the capacitor C3 define an LC resonant circuit. The resonant frequency of the LC resonant circuit is in a frequency band used in communication.

The inductor L1 defines a primary antenna, and the resonant circuit defined by the inductors L21 and L22 and the capacitor C3 defines a secondary antenna. The inductor L22 in particular contributes to coupling with the communication partner antenna 500.

Here, a plurality of antenna devices as comparative examples and results obtained by comparing the characteristics of these antenna devices are illustrated.

Figure 25A:
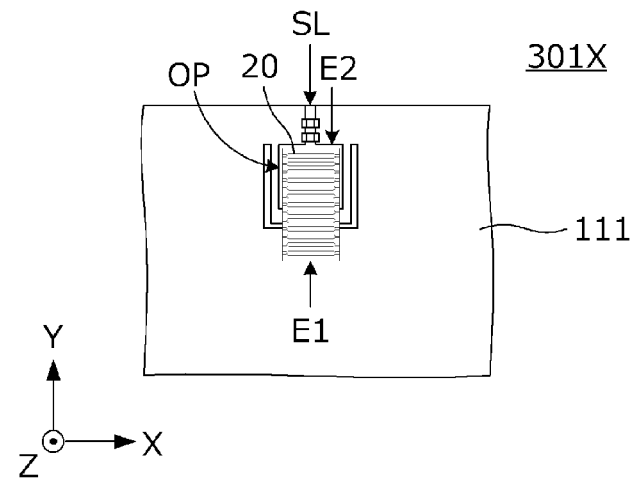
FIG. 25A is a partial plan view of an antenna device 301X of a comparative example.
Figure 25B:
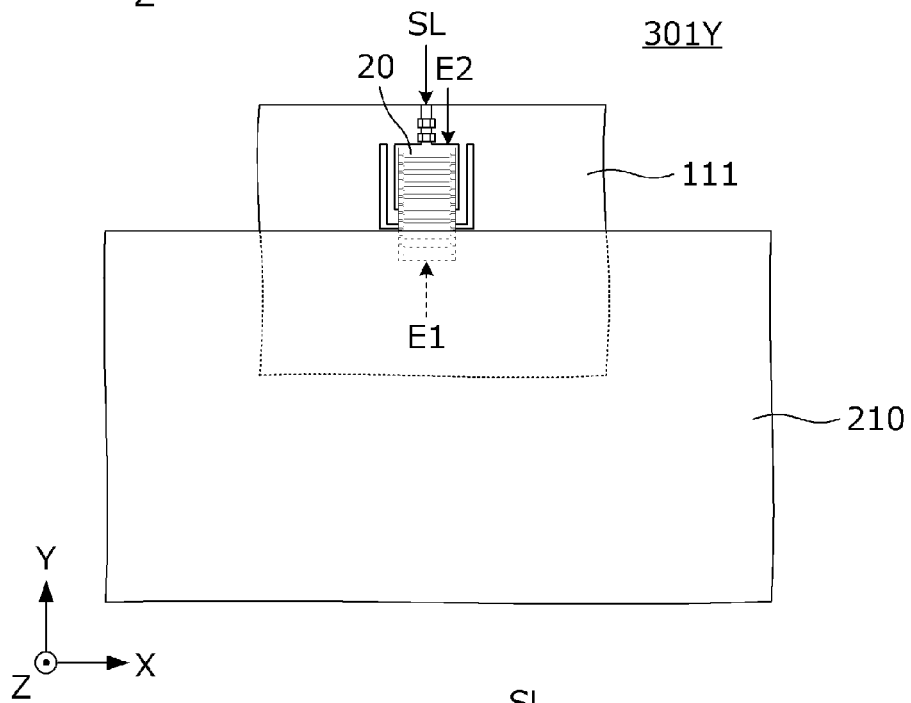
FIG. 25B is a plan view of an antenna device 301Y of a comparative example.
Figure 25C:
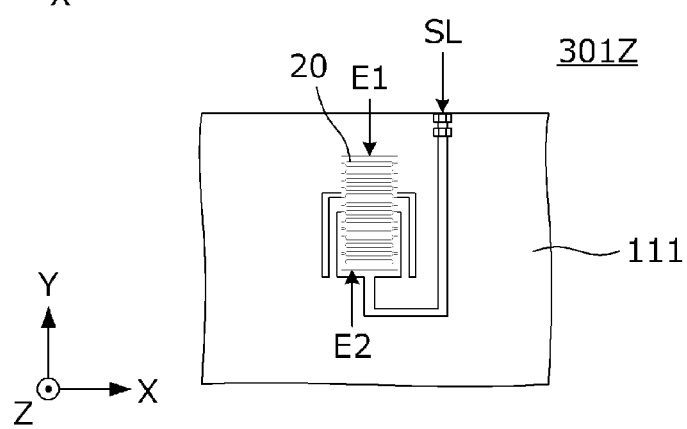
FIG. 25C is a plan view of an antenna device 301Z of a comparative example.

FIG. 25A is a partial plan view of an antenna device 301X of a comparative example, FIG. 25B is a plan view of an antenna device 301Y of a comparative example, and FIG. 25C is a plan view of an antenna device 301Z of a comparative example.

In the antenna device 301X, the first coil opening end E1 of the coil element 20 overlaps the first planar conductor 111, and the second coil opening end E2 of the coil element 20 overlaps the conductor opening OP.

Compared to the antenna device 301X, the antenna device 301Y further includes the second planar conductor 210, and the first coil opening end E1 of the coil element 20 is positioned inside a conductor overlapping region in which the first planar conductor 111 and the second planar conductor 210 overlap.

The antenna device 301Z is obtained by removing the second planar conductor 210 from the antenna device 301 of the first preferred embodiment.

Figure 10:
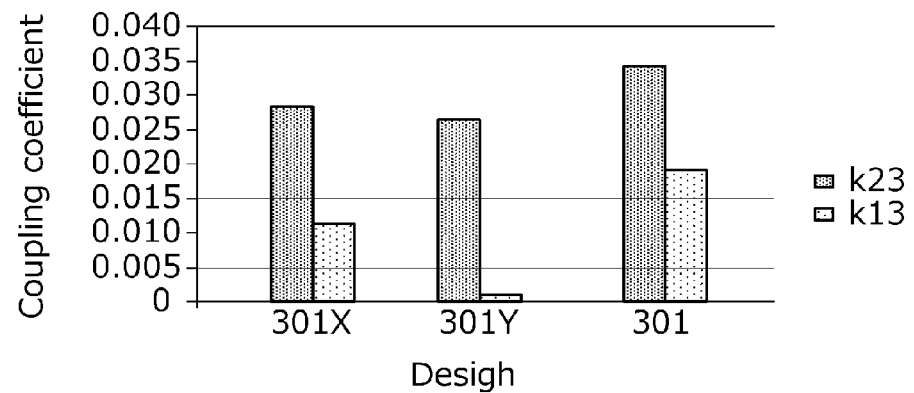
FIG. 10 is a diagram of simulation results illustrating coupling coefficients of the antenna device 301 and antenna devices 301X and 301Y of comparative examples.

FIG. 10 is a diagram of simulation results illustrating the coupling coefficients of the antenna device 301 of the present preferred embodiment and the antenna devices 301X and 301Y of the comparative examples. The dimensions of the respective elements of the antenna devices 301, 301X and 301Y are as follows.

First planar conductor 111: about 0 mm×about 20 mm
Second planar conductor 210: about 60 mm×about 60 mm
Conductor opening OP: about 4 mm×about 4 mm
Coil diameter of communication partner antenna: about 70 mm
Gap between coil element 20 and communication partner antenna: about 25 mm The coupling coefficient k23 between the loop-shaped current path and the communication partner antenna 500 and the coupling coefficient k13 between the coil antenna of the coil element 20 and the communication partner antenna 500 are both highest in the antenna device 301 of the present preferred embodiment and both lowest in the antenna device 301Y of the comparative example.

Next, specific examples of differences in a characteristic between the antenna device 301 of the present preferred embodiment and the antenna devices of the comparative examples will be described.

Table 1 illustrates an NFC characteristic of the antenna device 301 of the present preferred embodiment. In Table 1, the three parameters in parentheses represent the positional relationship between an antenna device that is the target of measurement (antenna device of this preferred embodiment) and the communication partner antenna device. In addition, the units of the numerical values in Table 1 are [mV].

Figure 26:
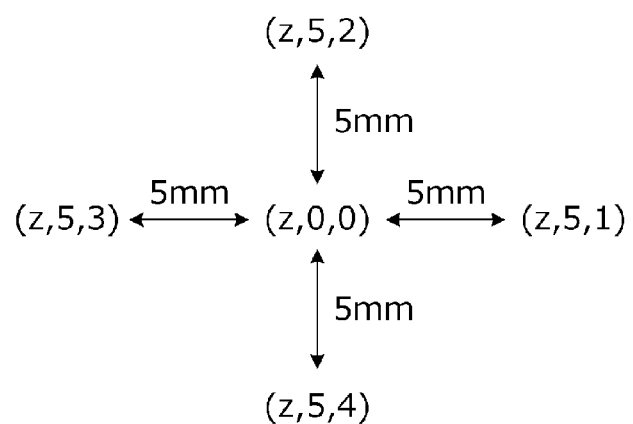
FIG. 26 is a diagram illustrating the positional relationships for (z,0,0), (z,5,1), (z,5,2), (z,5,3), and (z,5,4).

When the three parameters in parentheses are expressed as (z, r, θ), the meanings of these parameters are as follows.
z: separation in vertical direction
r: separation in horizontal direction
θ: direction of r
z=0: 0 mm
z=5: about 5 mm
r=0: 0 mm
r=5: about 5 mm
r=10: about 10 mm
θ=1 3 o'clock direction
θ=2 0 o'clock direction
θ=3 9 o'clock direction
θ=4 6 o'clock direction FIG. 26 is a diagram illustrating the positional relationships for (z,0,0), (z,5,1), (z,5,2), (z,5,3), and (z,5,4). Table 1

| (A) | | |
|---|---|---|
|  | 301Z | 301 |
| (0,0,0) | 5.20 | 5.01 |
| (0,5,1) | 5.07 | 4.98 |
| (0,5,2) | 5.21 | 5.14 |
| (0,5,3) | 5.36 | 5.12 |
| (0,5,4) | 5.20 | 4.89 |
| (5,0,0) | 4.29 | 4.36 |
| (5,5,1) | 4.10 | 4.17 |
| (5,5,2) | 4.25 | 4.31 |
| (5,5,3) | 4.31 | 4.37 |
| (5,5,4) | 4.34 | 4.40 |
| (5,10,1) | 3.70* | 3.76* |
| (5,10,2) | 4.21 | 4.23 |
| (5,10,3) | 4.03 | 4.07 |
| (5,10,4) | 4.40 | 4.44 |

| (B) | | |
|---|---|---|
|  | 301X | 301Y |
| (0,0,0) | 7.73 | 3.20* |
| (0,5,1) | 7.68 | 3.29* |
| (0,5,2) | 7.72 | 3.29* |
| (0,5,3) | 8.00 | 3.17* |
| (0,5,4) | 7.52 | 3.14* |
| (5,0,0) | 6.68 | 2.73* |
| (5,5,1) | 6.32 | 2.64* |
| (5,5,2) | 6.54 | 2.65* |
| (5,5,3) | 6.84 | 2.67* |
| (5,5,4) | 6.80 | 2.79* |
| (5,10,1) | 5.54 | 2.37* |
| (5,10,2) | 6.35 | 2.53* |
| (5,10,3) | 6.74 | 2.44* |
| (5,10,4) | 6.97 | 2.86* |

In part (A) of Table 1, the characteristic of the antenna device 301 of the present preferred embodiment and the characteristic of the antenna device 301Z of the comparative example are compared. The only difference between the antenna device 301 and the antenna device 301Z is the presence or absence of the second planar conductor 210. In part (B) of Table 1, the characteristic of the antenna device 301X of the comparative example and the characteristic of the antenna device 301Y of the comparative example are compared. The only difference between the antenna device 301X and the antenna device 301Y is the presence or absence of the second planar conductor 210.

In Table 1, conditions for which the measured value was less than about 3.9 are indicated using asterisks. There is little degradation in the characteristic caused by the presence of the second planar conductor 210, and rather there are also conditions in which the characteristic is improved as is clear by comparing the antenna device 301 of the present preferred embodiment and the antenna device 301Z of the comparative example. In contrast, in the case of a structure in which the coil opening end (first coil opening end E1) on the opposite side from the coil opening end (second coil opening end E2) that overlaps the conductor opening is covered by the second planar conductor 210, the characteristic is severely degraded by the presence of the second planar conductor 210 as is clear by comparing the antenna devices 301X and 301Y of the comparative examples.

The characteristic of the antenna device 301X of the comparative example is better than that of the antenna device 301 of the present preferred embodiment due to the difference in the ground conductor pattern near to the portion at which the coil element is mounted.

Hereafter, the reasons why the coupling coefficients k23 and k13 are high in the antenna device of the present preferred embodiment will be explained with reference to a number of drawings.

Figure 11A:
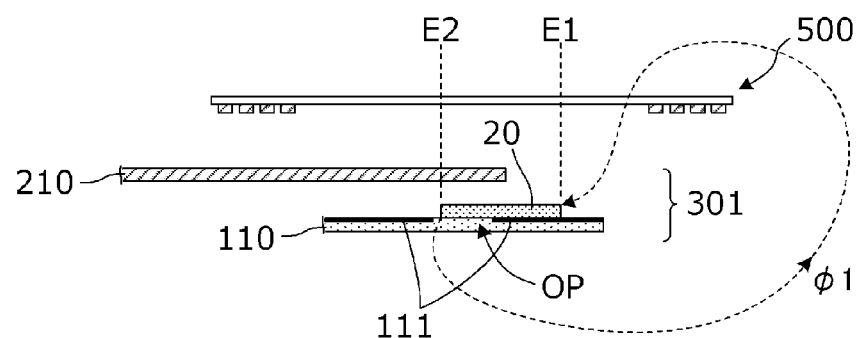
FIG. 11A is a sectional view schematically illustrating magnetic flux that passes through the coil element 20 of the antenna device 301 and the communication partner antenna 500.
Figure 11A:
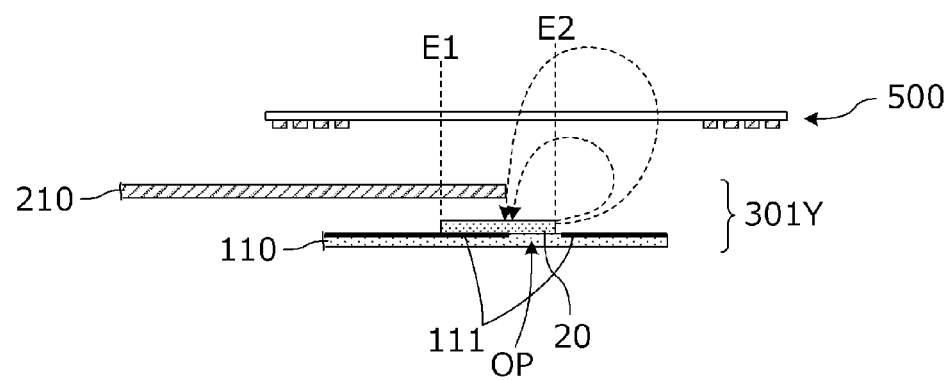

FIG. 11A is a sectional view schematically illustrating magnetic flux that passes through the coil element 20 of the antenna device 301 of the present preferred embodiment and the communication partner antenna 500. FIG. 11B is a sectional view schematically illustrating magnetic flux that passes through the coil element 20 of the antenna device 301Y of the comparative example and the communication partner antenna 500.

In the antenna device 301Y of the comparative example, as illustrated in FIG. 11B, magnetic flux that exits the second coil opening end E2 of the coil element 20 draws a small magnetic flux loop and returns to a point midway along the coil element 20. Therefore, the magnetic coupling between the coil element 20 and the communication partner antenna 500 is very weak.

In contrast, in the case of the antenna device 301 of the present preferred embodiment, as illustrated in FIG. 11A, magnetic flux φ1 that exits the second coil opening end E2 of the coil element 20 passes the conductor opening OP, loops around outside the first planar conductor 111, passes through the coil opening of the communication partner antenna 500, and returns to the first coil opening end E1 of the coil element 20. Thus, the coil element 20 and the communication partner antenna 500 are magnetically coupled with each other.

Figure 12A:
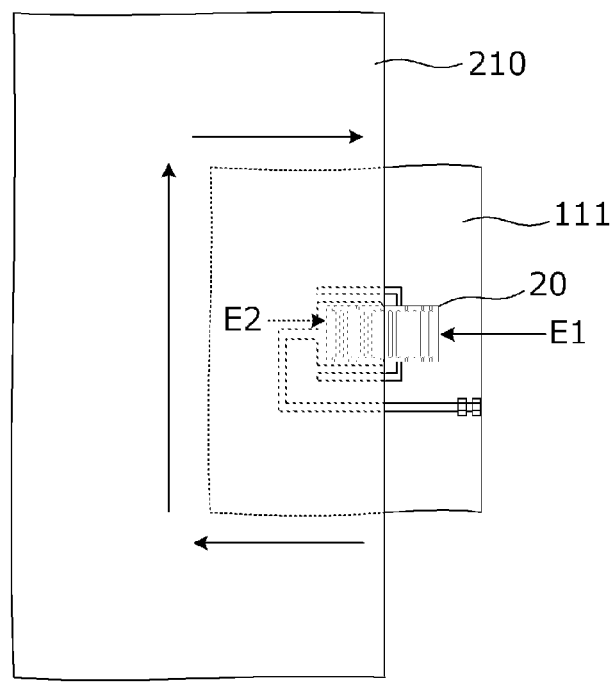
FIGS. 12A and 12B are diagrams illustrating the effect of magnetic field strength being increased by a second planar conductor 210.
Figure 12B:
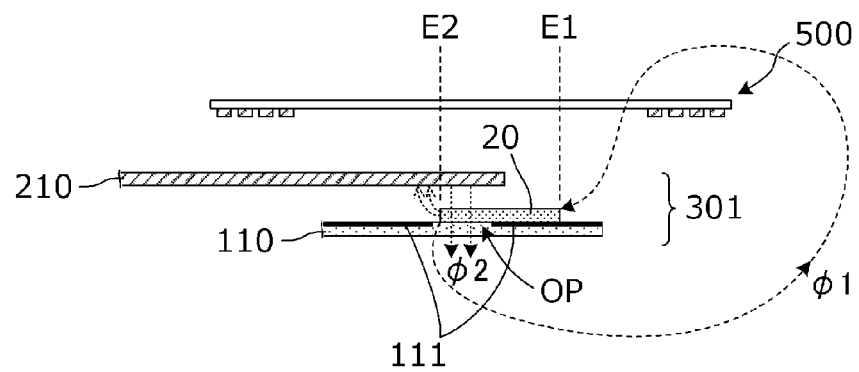

FIGS. 12A and 12B are diagrams illustrating the effect of magnetic field strength being increased by the second planar conductor 210. FIG. 12A is a diagram that schematically illustrates an eddy current that is coupled with the coil element 20 and flows in the second planar conductor 210. FIG. 12B is a sectional view illustrating the coupling relationship between the coil element 20 and the second planar conductor 210.

The eddy current is induced in the second planar conductor 210 by magnetic flux flowing toward the second planar conductor 210 out of the magnetic flux emitted from the coil element 20, and magnetic flux φ2 is generated from the second planar conductor 210 by the eddy current in such a direction as to strengthen the magnetic field of the coil element 20. The magnetic flux φ2 flows in such a direction as to strengthen the magnetic flux φ1, which flows in a direction from the coil element 20 toward the conductor opening OP, and therefore, an effect of the magnetic field strength being increased by the second planar conductor 210 is obtained.

Figure 13:
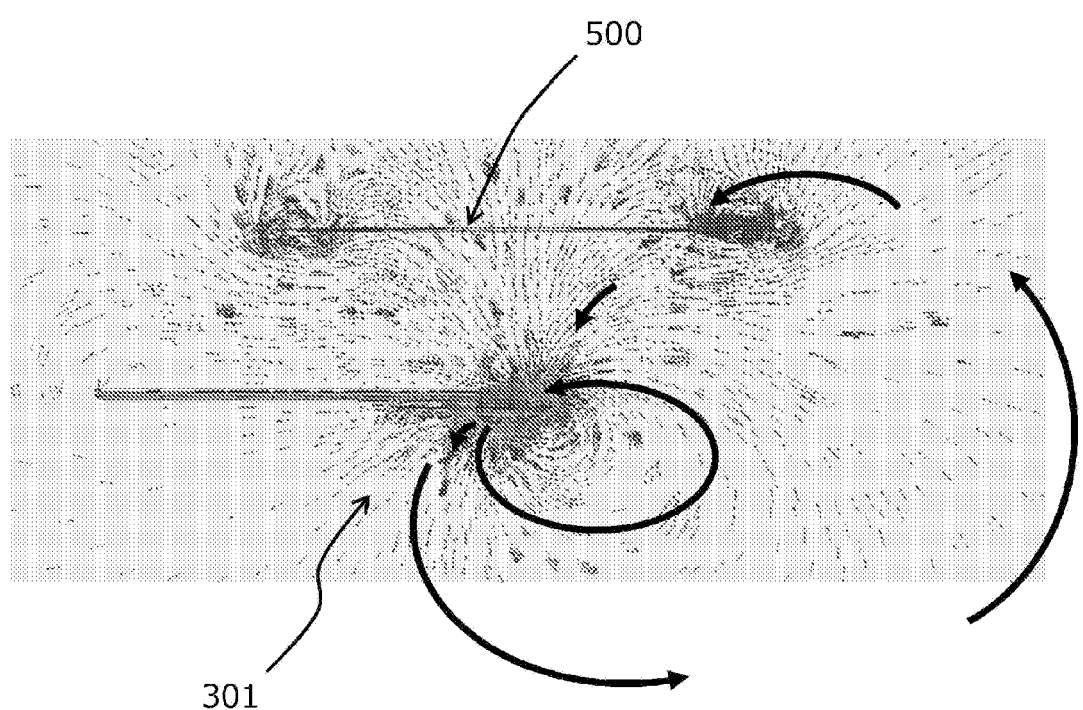
FIG. 13 is a diagram of simulation results illustrating the state of magnetic coupling between the antenna device 301 and the communication partner antenna 500.
Figure 14A:
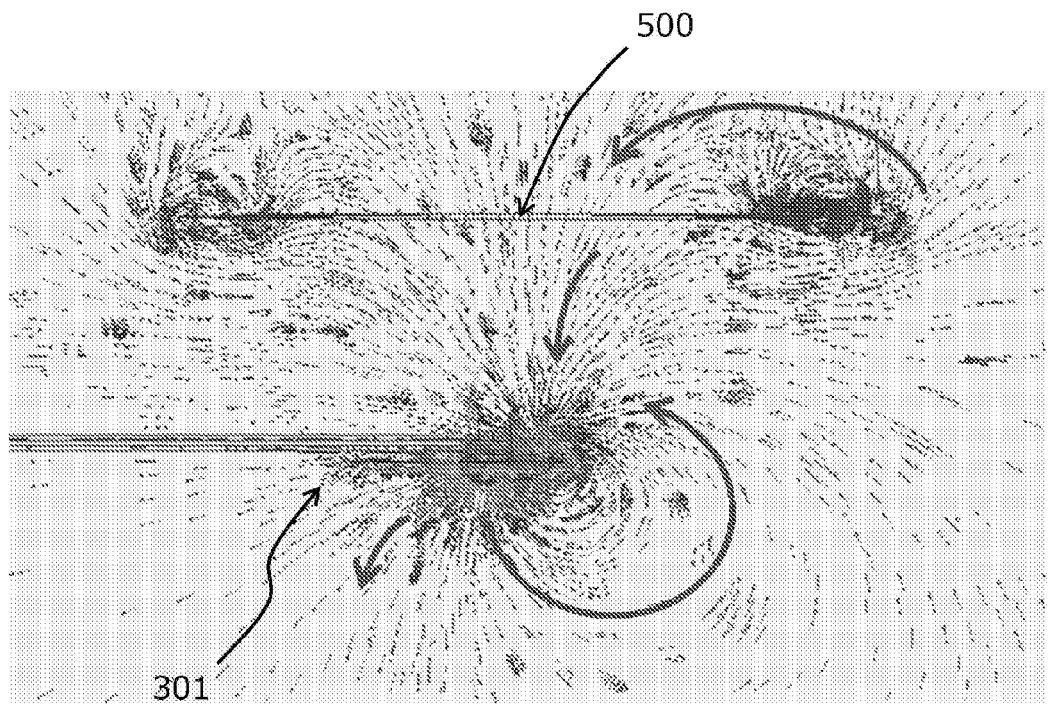
FIG. 14A is a diagram of simulation results illustrating the state of magnetic coupling between the antenna device 301 and the communication partner antenna 500.
Figure 14B:
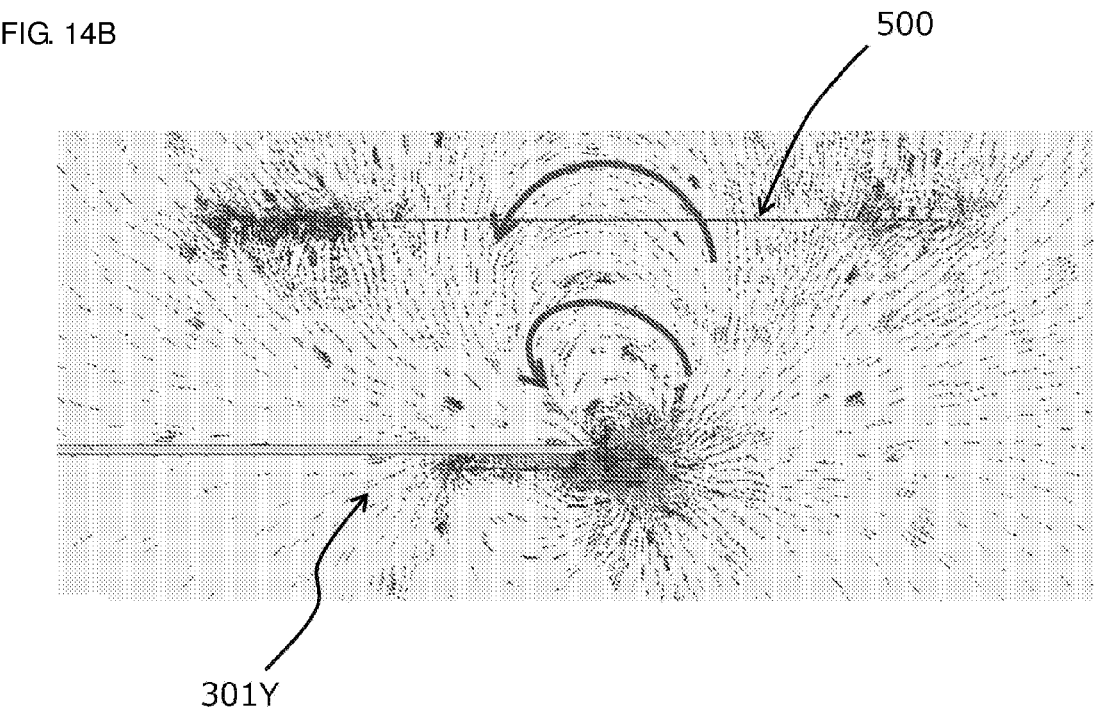
FIG. 14B is a diagram of simulation results illustrating the state of magnetic coupling between the antenna device 301Y of the comparative example and the communication partner antenna 500.
Figure 15A:
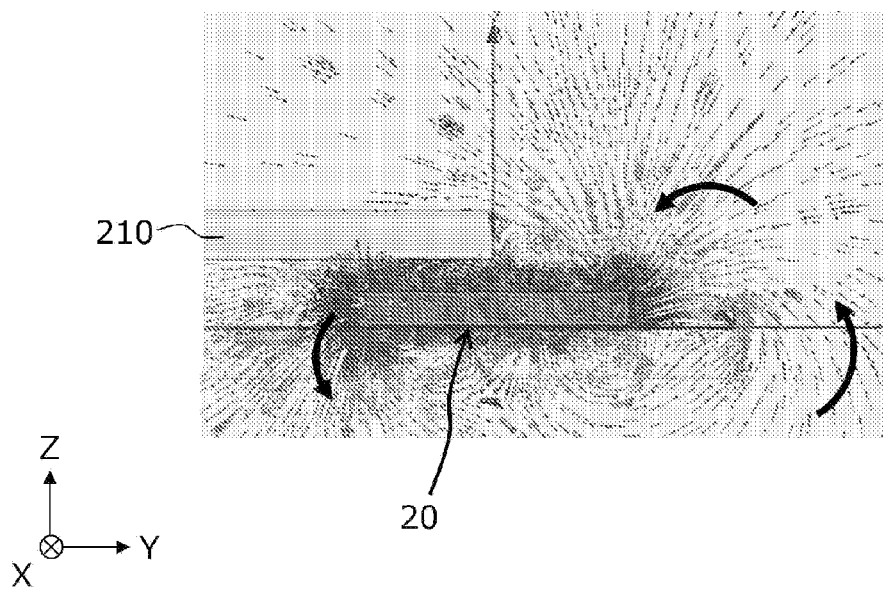
FIG. 15A is a diagram of simulation results illustrating the magnetic field in the vicinity of the coil element 20 and the second planar conductor 210 in the antenna device 301.
Figure 15B:
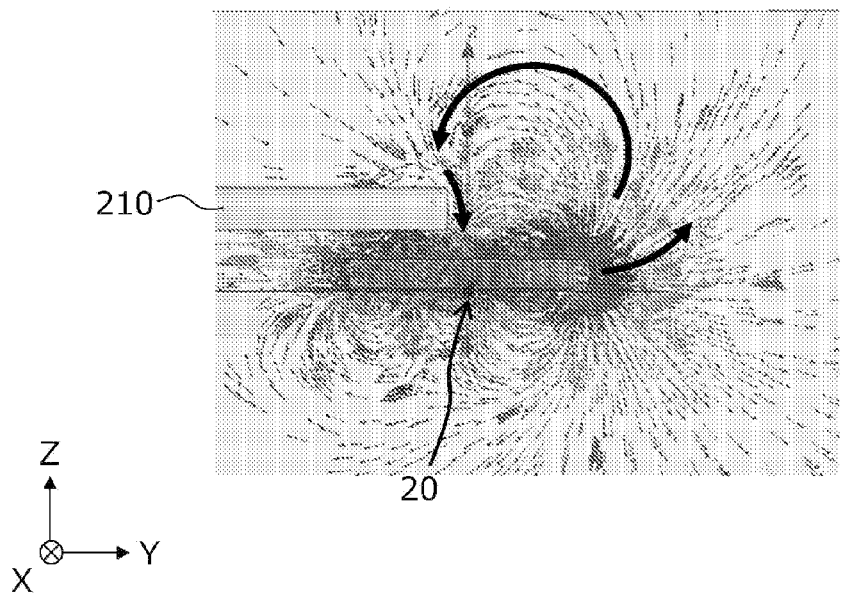
FIG. 15B is a diagram of simulation results illustrating the magnetic field in the vicinity of the coil element 20 and the second planar conductor 210 in the antenna device 301Y of the comparative example.

FIGS. 13 and 14A are diagrams of simulation results illustrating the state of magnetic coupling between the antenna device 301 of the present preferred embodiment and the communication partner antenna 500. FIG. 14B is a diagram of simulation results illustrating the state of magnetic coupling between the antenna device 301Y of the comparative example and the communication partner antenna 500. FIG. 15A is a diagram of simulation results illustrating the magnetic field in the vicinity of the coil element 20 and the second planar conductor 210 in the antenna device 301 of the present preferred embodiment, and FIG. 15B is a diagram of simulation results illustrating the magnetic field in the vicinity of the coil element 20 and the second planar conductor 210 in the antenna device 301Y of the comparative example. In each diagram, many very small arrows indicate the direction of the magnetic flux.

As illustrated in FIG. 15B, in the antenna device 301Y of the comparative example, magnetic flux that exits the second coil opening end (right end in the orientation of the drawing) of the coil element 20 is unable to pass through the second planar conductor 210, draws a small magnetic flux loop, and returns to a point midway along the coil element 20. In addition, as illustrated in FIG. 14B, the magnetic flux spreads in a direction toward the center or approximate of the communication partner antenna 500 and is unlikely to interlink with the communication partner antenna 500. Therefore, the magnetic coupling with the communication partner antenna 500 is very weak.

In contrast, as illustrated in FIGS. 15A, 14A, and 13, magnetic flux that exits the second coil opening end (left end in the orientation of FIG. 15A) of the coil element 20 flows in a large loop, passes through the coil opening of the communication partner antenna 500, and returns to the first coil opening end (right end) of the coil element 20. Thus, the coil element 20 and the communication partner antenna 500 are magnetically coupled with each other.

According to the present preferred embodiment, a portion of the conductor opening OP is positioned inside the conductor overlapping region OA in which the first planar conductor 111 and the second planar conductor 210 overlap in a plan view of the first planar conductor 111, the first coil opening end E1 of the coil element 20 does not overlap the second planar conductor 210 in a plan view of the first planar conductor 111, and the second coil opening end E2 of the coil element 20 overlaps the conductor opening OP and the second planar conductor 210 in a plan view of the first planar conductor 111. Therefore, magnetic flux that passes through the coil element flows in a large loop outside the coil element and strongly couples with the communication partner antenna.

In the present preferred embodiment, an example has been described in which the first planar conductor 111 and the line conductor portions 21A and 21B are conductor patterns that are provided on the same surface of the circuit board 110, but the first planar conductor 111 and the line conductor portions 21A and 21B may instead be provided on different surfaces or different layers. In addition, the first planar conductor 111 and/or the line conductor portions 21A and 21B may be provided on a surface other than a surface of the circuit board.

Furthermore, in the present preferred embodiment, an example has been described in which the second planar conductor 210 covers a portion of the conductor opening OP, but the second planar conductor 210 may instead cover the entirety of the conductor opening OP.

Second Preferred Embodiment

In a second preferred embodiment of the present invention, an antenna device that includes a coil element not including an auxiliary conductor is described.

Figure 16:
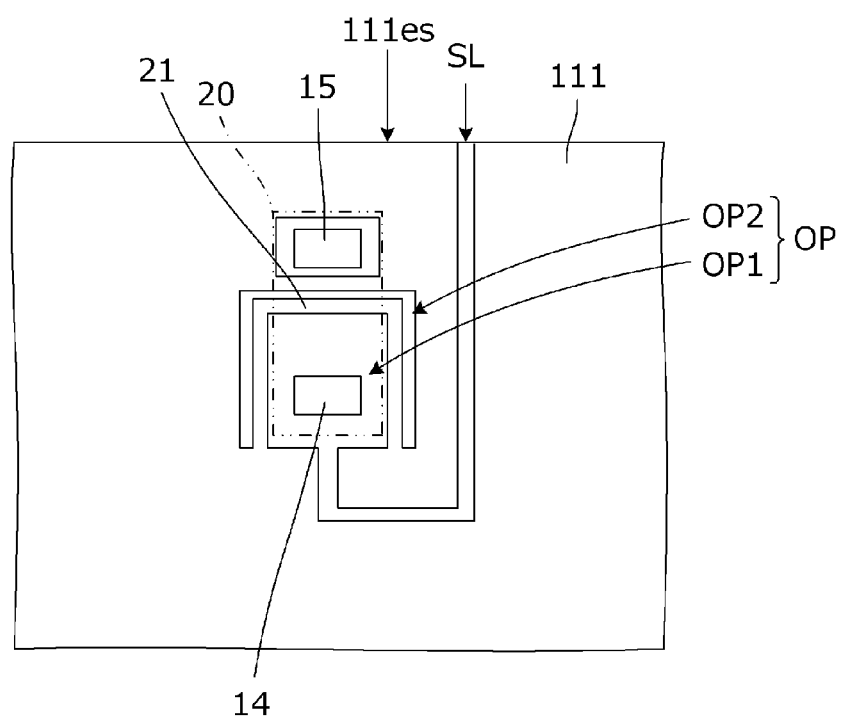
FIG. 16 is a plan view of a coil element mounting portion of an antenna device according to a second preferred embodiment of the present invention.

FIG. 16 is a plan view of a coil element mounting portion of the antenna device according to the second preferred embodiment. The coil element 20 is indicated by the two-dot chain line.

As illustrated in FIG. 16, the first planar conductor 111 includes a first conductor opening OP1, a second conductor opening OP2, a conductor outer edge 111es, and a slit SL that connects the conductor opening OP and the conductor outer edge 111es to each other.

In the present preferred embodiment, inside the coil element 20, there is no auxiliary conductor having an approximately one turn rectangular or substantially rectangular loop shape defined by the line conductors 71A, 71B, 71E, 71F, 71G, and 71H and the end surface conductors 71C, 71D, and so on illustrated in FIG. 4. A line conductor portion 21 inside the conductor opening OP is magnetically coupled with the coil conductor inside the coil element 20.

As in the present preferred embodiment, a configuration may be used in which a line conductor portion on the circuit board and the coil conductor of the coil element are close to each other and consequently magnetically couple with each other.

Third Preferred Embodiment

In a third preferred embodiment of the present invention, an antenna device in which there is no line conductor portion inside the conductor opening is described.

Figure 17A:
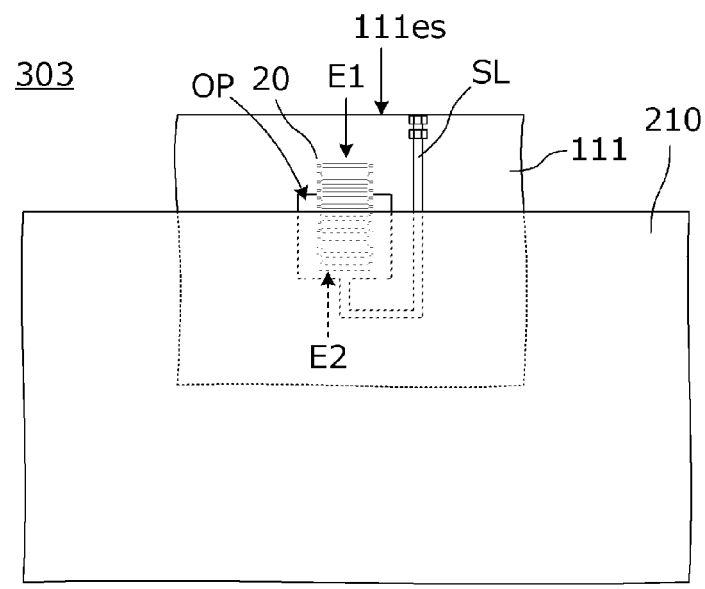
FIG. 17A is a plan view of an antenna device 303 of a third preferred embodiment of the present invention.
Figure 17B:
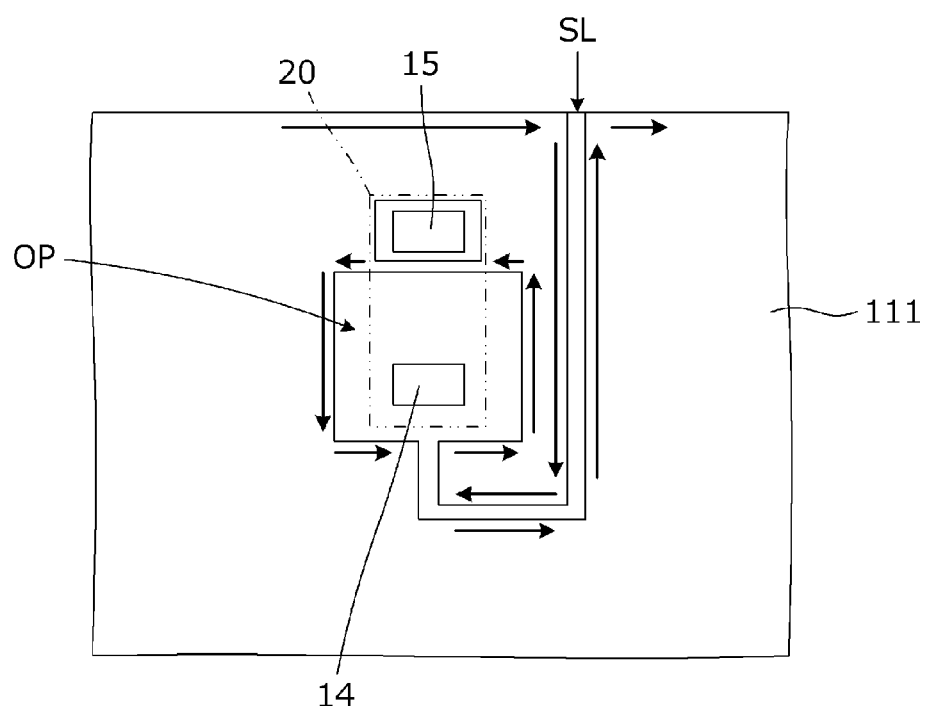
FIG. 17B is a plan view of a coil element arrangement portion prior to mounting of a coil element.

FIG. 17A is a plan view of an antenna device 303 of the third preferred embodiment, and FIG. 17B is a plan view of a coil element arrangement portion prior to mounting of a coil element. In the antenna device 303, the first planar conductor 111 includes the conductor opening OP, the conductor outer edge 111es, and the slit SL that connects the conductor opening OP and the conductor outer edge 111es to each other.

A portion of the conductor opening OP is positioned inside a conductor overlapping region in which the first planar conductor 111 and the second planar conductor 210 overlap in a plan view of the first planar conductor 111. In addition, the first coil opening end E1 of the coil element 20 is close to the conductor outer edge 111es in a region outside the conductor overlapping region. The second coil opening end E2 of the coil element 20 overlaps the conductor opening OP inside the conductor overlapping region in a plan view of the first planar conductor 111.

In the antenna device 303 of the present preferred embodiment, since the second coil opening end E2 of the coil element 20 is positioned inside the conductor opening OP in a plan view, the coil element 20 and the first planar conductor 111 magnetically couple with each other and a current flows in the first planar conductor 111 as indicated by the arrows in FIG. 17B. The rest of the configuration is the same or substantially the same as that of the antenna device described in the second preferred embodiment.

The present invention may also be applied in the case in which there are no line conductor portions (line conductor portions 21A and 21B in FIG. 2) connected to two points on the inner edge of the conductor opening OP as in the present preferred embodiment, and may also be applied to an antenna device having a structure in which there are no capacitors that define a loop-shaped current path together with the first planar conductor 111 and the line conductor portions.

Fourth Preferred Embodiment

In a fourth preferred embodiment of the present invention, an example is described in which the position of the open end of the slit SL of the first planar conductor 111 is different from that in the preferred embodiments described thus far.

Figure 18A:
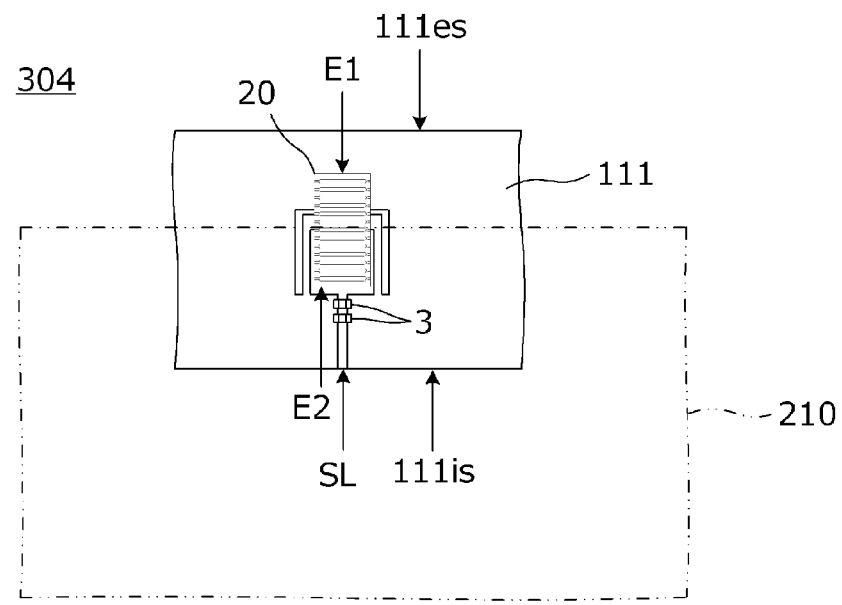
FIG. 18A is a plan view of an antenna device 304 of a fourth preferred embodiment of the present invention.
Figure 18B:
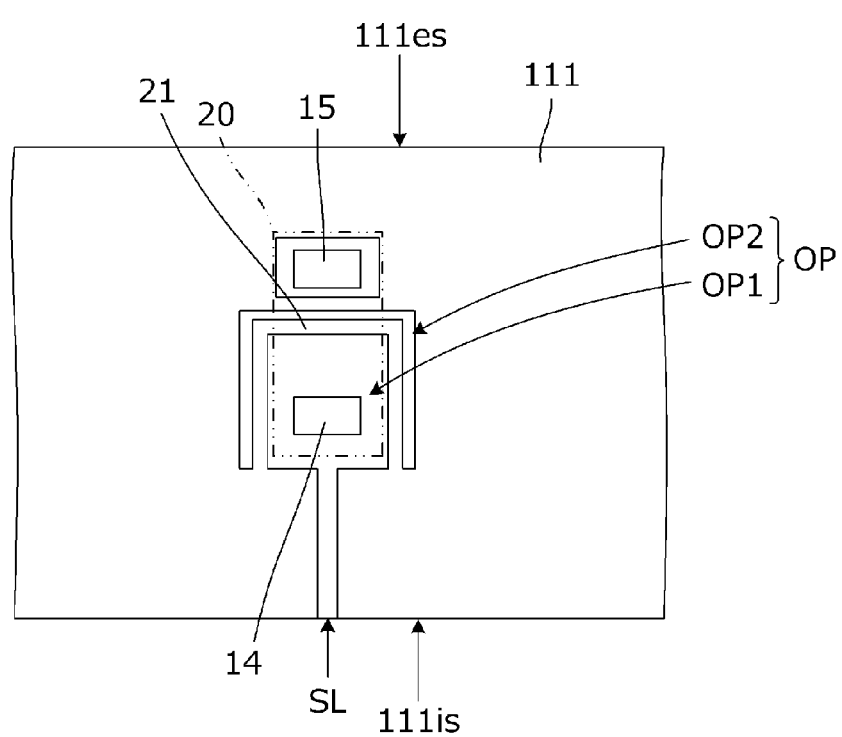
FIG. 18B is a plan view of a coil element arrangement portion prior to mounting of a coil element 20 and capacitors 3.

FIG. 18A is a plan view of an antenna device 304 of the fourth preferred embodiment, and FIG. 18B is a plan view of a coil element arrangement portion prior to mounting of the coil element 20 and the capacitors 3. In the antenna device 304, the first planar conductor 111 includes a conductor opening OP, a conductor outer edge 111is, and a slit SL that connects the conductor opening OP and the conductor outer edge 111is to each other.

The conductor outer edge 111is along which the slit SL, which extends from the conductor opening OP, opens is positioned inside a conductor overlapping region in which the first planar conductor 111 and the second planar conductor 210 overlap in a plan view. The rest of the configuration is the same or substantially the same as that of the antenna device described in the first preferred embodiment.

Preferred embodiments of the present invention can also be applied in a case in which the open end of the slit SL is positioned inside the conductor overlapping region in which the first planar conductor 111 and the second planar conductor 210 overlap as in this preferred embodiment, and the same or similar advantageous effects are obtained.

Fifth Preferred Embodiment

In a fifth preferred embodiment of the present invention, the configurations of an electronic appliance and an antenna device provided in the electronic appliance are described.

Figure 19:
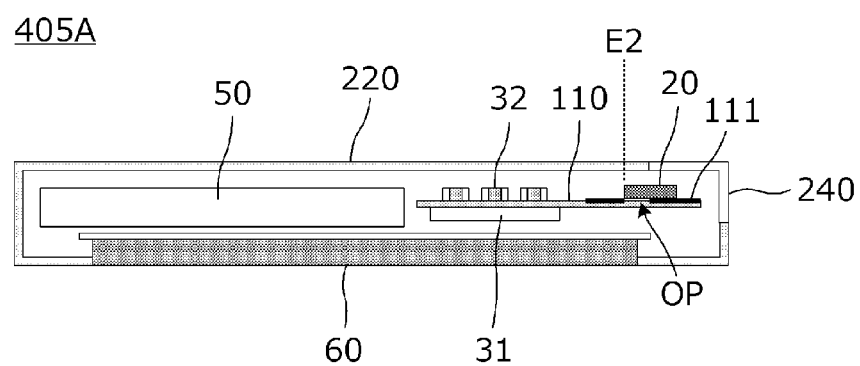
FIG. 19 is a sectional view of a main portion of an electronic appliance 405A according to a fifth preferred embodiment of the present invention.

FIG. 19 is a sectional view of a main portion of an electronic appliance 405A according to the fifth preferred embodiment. The electronic appliance 405A is, for example, a mobile electronic appliance, such as a smartphone, and includes a metal casing portion 220, a resin casing portion 240, and a display/operation panel 60. The metal casing portion 220 is provided on the opposite side from a surface at which the display/operation panel 60 is provided. The circuit board 110 and a battery 50 are accommodated inside the casing. A ground conductor pattern defines the first planar conductor 111 on the circuit board 110. In addition, the coil element 20, electronic components 31 and 32, and other elements are mounted on the circuit board 110. The resin casing portion 240 is provided such that a portion of the coil element 20 and a portion of the first planar conductor 111 are not covered by a conductor.

In the electronic appliance 405A, the metal casing portion 220 corresponds to a "second planar conductor". The positional relationship between the metal casing portion 220, which defines the second planar conductor, the first planar conductor 111, and the conductor opening OP is the same or substantially the same as in the antenna devices described in the first to fourth preferred embodiments.

Figure 20:
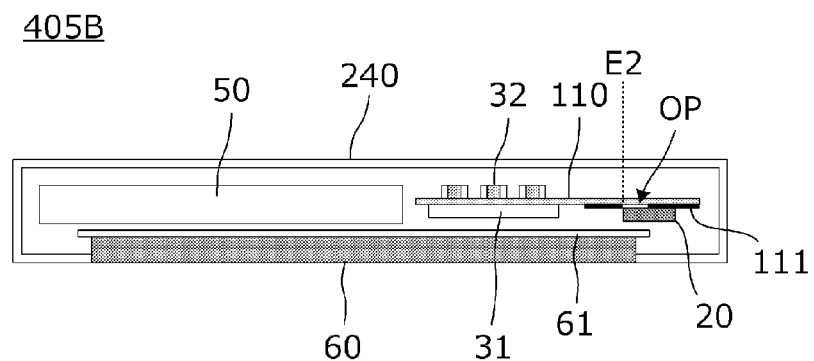
FIG. 20 is a sectional view of a main portion of another electronic appliance 405B according to the fifth preferred embodiment of the present invention.

FIG. 20 is a sectional view of a main portion of another electronic appliance 405B according to the fifth preferred embodiment. The electronic appliance 405B is also, for example, a mobile electronic appliance, such as a smartphone, and includes the resin casing portion 240 and the display/operation panel 60. The display/operation panel 60 includes a back metal plate 61, which defines and functions as a shield layer and reinforcement. The circuit board 110 and a battery 50 are accommodated inside the casing. A ground conductor pattern is defines the first planar conductor 111 on the circuit board 110. In addition, the coil element 20, electronic components 31 and 32, and other elements are mounted on the circuit board 110.

In the electronic appliance 405B, the back metal plate 61 corresponds to a "second planar conductor". The positional relationship between the back metal plate 61, which defines and functions as the second planar conductor, the first planar conductor 111, and the conductor opening OP is the same or substantially the same as in the antenna devices described in the first to fourth preferred embodiments.

Other than a metal casing portion and a back metal plate of a display device, a metal portion, such as a chassis or a battery inside an electronic appliance, may be used as the second planar conductor.

Sixth Preferred Embodiment

In a sixth preferred embodiment of the present invention, the configuration of an antenna device is described in which the relationship between the sizes of the first planar conductor and the second planar conductor is different from the examples described thus far.

Figure 21A:
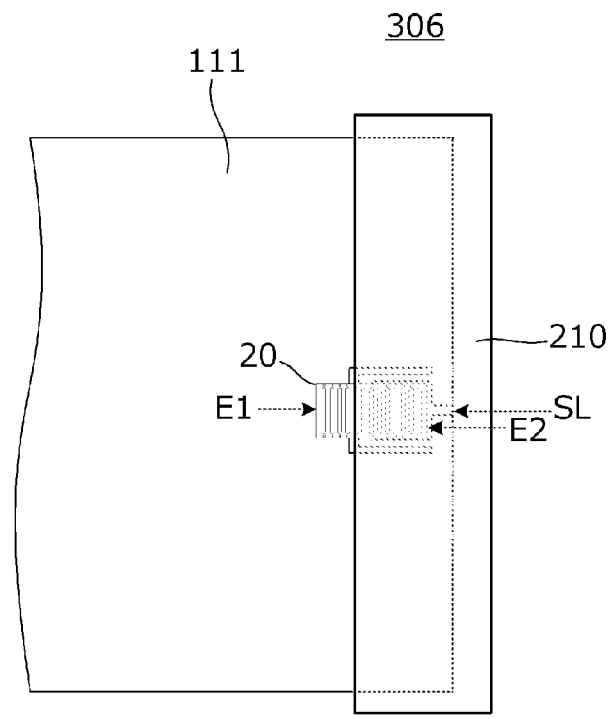
FIG. 21A is a plan view of an antenna device according to a sixth preferred embodiment of the present invention.
Figure 21B:
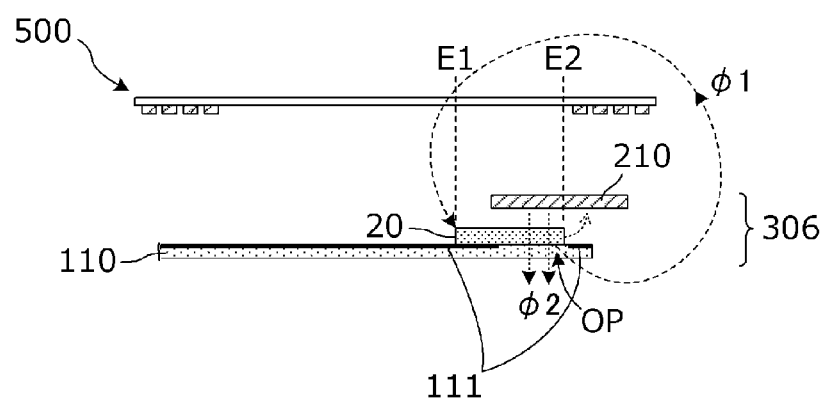
FIG. 21B is a vertical sectional view taken along a plane extending along the coil winding axis of a coil element 20.

FIG. 21A is a plan view of an antenna device 306 according to the sixth preferred embodiment, and FIG. 21B is a vertical sectional view taken along a plane extending along the coil winding axis of the coil element 20. In contrast to the example illustrated in FIGS. 12A and 12B, the area of the second planar conductor 210 is smaller than that of the first planar conductor 111. In other respects, the antenna device is the same or substantially the same as that illustrated in FIGS. 12A and 12B.

In the present preferred embodiment, the magnetic flux flows in a large loop so as to go around the second planar conductor 210, and therefore, strongly couples with the communication partner antenna 500.

In the present preferred embodiment as well, similarly to as in the antenna device illustrated in FIGS. 12A and 12B, an eddy current is induced in the second planar conductor 210 by magnetic flux flowing toward the second planar conductor 210 out of the magnetic flux emitted from the coil element 20, and magnetic flux φ2 is generated from the second planar conductor 210 by this eddy current in such a direction as to strengthen the magnetic field of the coil element 20. The magnetic flux φ2 flows in a direction to strengthen the magnetic flux φ1, which flows in a direction from the coil element 20 toward the conductor opening OP, and therefore, an effect of the magnetic field strength being increased by the second planar conductor 210 is obtained.

In addition, in the present preferred embodiment, the magnetic flux flows in a large loop around the second planar conductor 210, and therefore, strongly couples with the communication partner antenna 500.

Seventh Preferred Embodiment

In a seventh preferred embodiment of the present invention, the configuration of an antenna device in which another planar conductor is disposed next to the second planar conductor will be described.

Figure 22A:
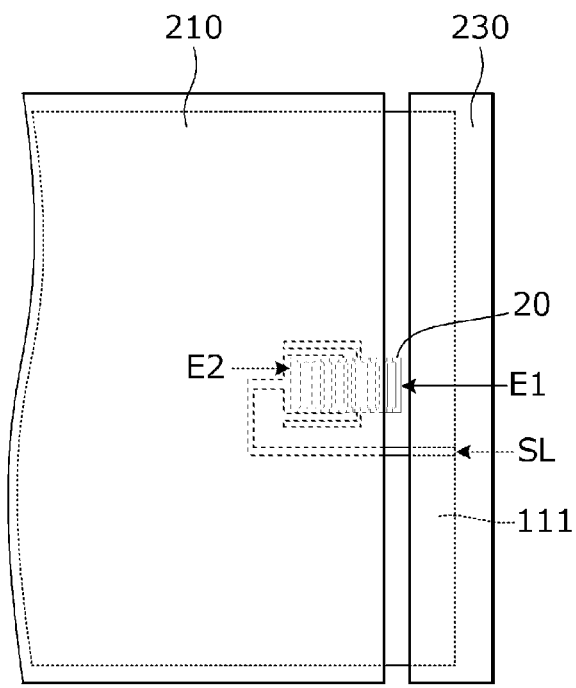
FIG. 22A is a plan view of an antenna device according to a seventh preferred embodiment of the present invention.
Figure 22B:
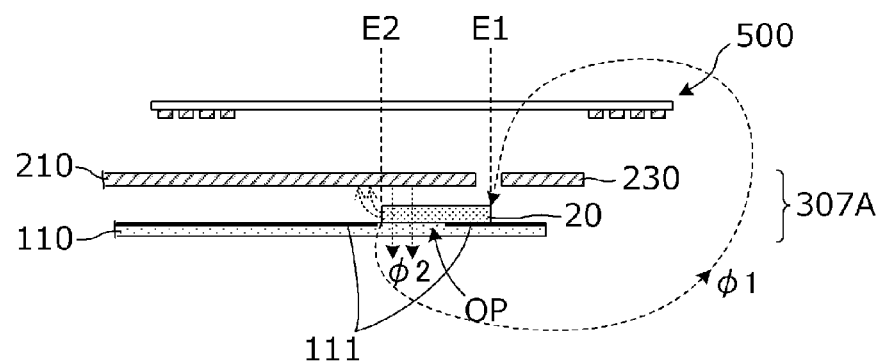
FIG. 22B is a vertical sectional view of the antenna device taken along a plane extending along the coil winding axis of a coil element 20.
Figure 23A:
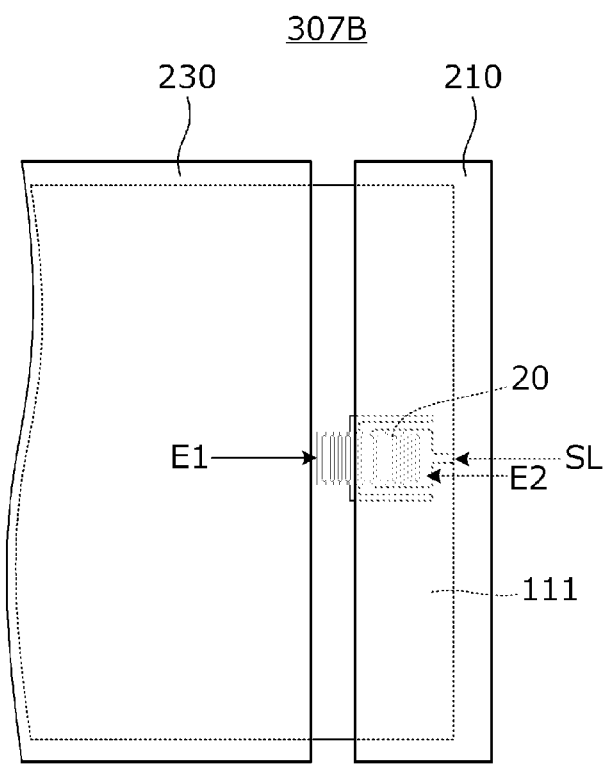
FIG. 23A is a plan view of another antenna device according to the seventh preferred embodiment of the present invention.
Figure 23B:
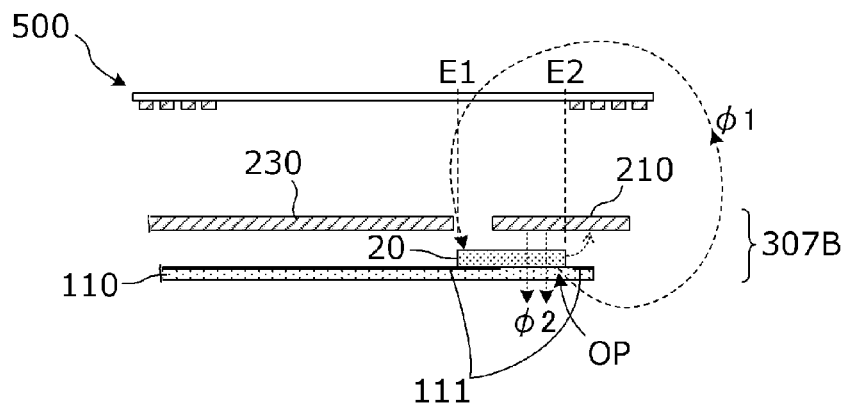
FIG. 23B is a vertical sectional view of the antenna device taken along a plane extending along the coil winding axis of a coil element 20.

FIG. 22A is a plan view of an antenna device 307A according to the seventh preferred embodiment, and FIG. 22B is a vertical sectional view of the antenna device 307A taken along a plane extending along the coil winding axis of the coil element 20. In addition, FIG. 23A is a plan view of another antenna device 307B according to the seventh preferred embodiment, and FIG. 23B is a vertical sectional view of the antenna device 307B taken along a plane extending along the coil winding axis of the coil element 20.

In contrast to the example illustrated in FIGS. 12A and 12B, the antenna device of the present preferred embodiment further includes a metal casing portion 230. In the present preferred embodiment, the second planar conductor 210 is also a portion of the metal casing portion.

As in the present preferred embodiment, a conductor (metal casing portion 230) that does not overlap the first coil opening end E1 in a plan view may be provided. In the present preferred embodiment, an eddy current is induced in the second planar conductor 210 by magnetic flux flowing toward the second planar conductor 210 out of the magnetic flux emitted from the coil element 20, and magnetic flux φ2 is generated from the second planar conductor 210 by the eddy current in a direction to strengthen the magnetic field of the coil element 20. The magnetic flux φ2 flows in a direction to strengthen the magnetic flux φ1, which flows in a direction from the coil element 20 toward the conductor opening OP, and therefore, an effect of the magnetic field strength being increased by the second planar conductor 210 is obtained.

Eighth Preferred Embodiment

In an eighth preferred embodiment of the present invention, the configuration of an antenna device is described in which the configuration of the second planar conductor is different from that in the examples described thus far.

Figure 24A:
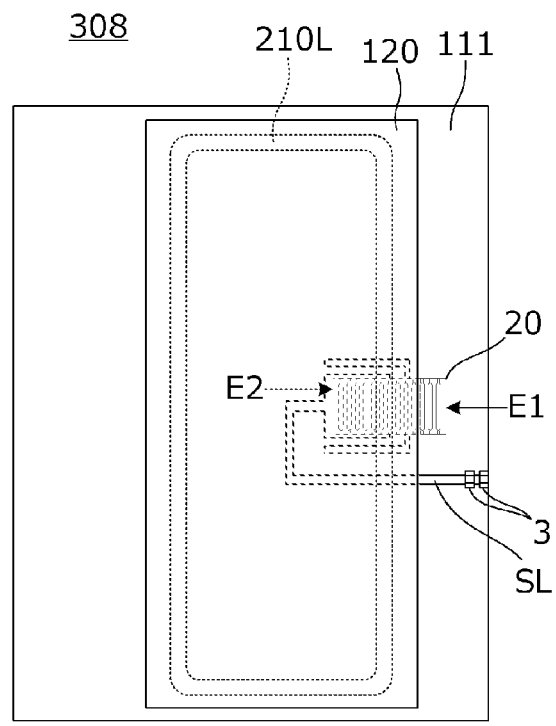
FIG. 24A is a plan view of an antenna device according to an eighth preferred embodiment of the present invention.
Figure 24B:
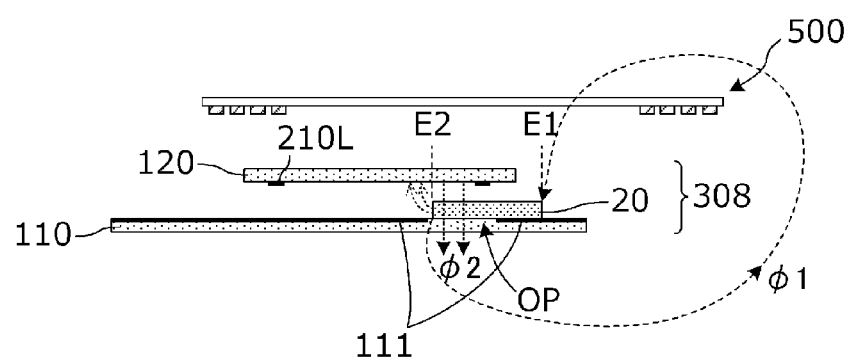
FIG. 24B is a vertical sectional view of the antenna device taken along a plane extending along the coil winding axis of the coil element 20.

FIG. 24A is a plan view of an antenna device 308 according to the eighth preferred embodiment. FIG. 24B is a vertical sectional view of the antenna device 308 taken along a plane extending along the coil winding axis of the coil element 20. The antenna device 308 includes a second planar conductor 210L. The configuration of the second planar conductor is different from that in the antenna device illustrated in FIG. 1B. The second planar conductor 210L of the antenna device 308 of the present preferred embodiment is a closed-loop-shaped conductor pattern. The second planar conductor 210L is a conductor pattern that is provided on a circuit board 120.

The second planar conductor 210L is different from the second planar conductors 210 in the preferred embodiments described thus far, and is not a conductor that extends in a planar shape in a continuous manner, but rather is a conductor that defines a closed loop along a surface. Since magnetic flux that attempts to interlink with the closed loop is blocked by the second planar conductor 210L, the second planar conductor 210L functions in the same or substantially the same manner as the second planar conductors 210 described thus far.

A second planar conductor defining a closed loop is not limited to one defined by a conductor pattern, and a structure such as a metal frame may be provided instead.

In preferred embodiments of the present invention, the term "second planar conductor" is not limited to meaning a conductor that extends in a continuous manner in a planar shape over an entire surface, but is instead intended to mean "a conductor that occupies space in a planar shape (that is, so as to define a plane) so as to block passage of magnetic flux". As illustrated in FIG. 24A, a conductor pattern that defines a closed loop along one surface is also included in the meaning of "second planar conductor".

In the preferred embodiments of the present invention, an example is described in which components mounted on the circuit board are chip components, such as chip capacitors, but the present invention is not limited to these preferred embodiments. For example, such components may instead be lead-terminal components or elements provided on a flexible substrate.

Although a structure in which the width of the slit SL is smaller than the width of the conductor opening OP is exemplified in each preferred embodiment, the present invention is not limited to this configuration. For example, the width of the slit SL may be equal to or greater than the width of the conductor opening OP, and the width of the conductor opening OP may be equal to or less than the width of the slit SL. In addition, an integrated notch portion having a U shape or other suitable shape may be defined by the conductor opening OP and the slit SL.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   a first planar conductor;
   a second planar conductor that opposes the first planar conductor in a parallel or substantially parallel arrangement; and
   a coil antenna with a winding axis that extends in a direction parallel or substantially parallel to the first planar conductor and the second planar conductor, and includes a first coil opening end and a second coil opening end that faces the first coil opening end; wherein
   the first planar conductor includes a conductor outer edge, and a conductor opening including a portion that is continuous with the conductor outer edge;

at least a portion of the conductor opening is positioned inside a conductor overlapping region in which the first planar conductor and the second planar conductor overlap in a plan view of the first planar conductor;

the first coil opening end of the coil antenna does not overlap the second planar conductor in a plan view of the first planar conductor; and the second coil opening end of the coil antenna overlaps the conductor opening and the second planar conductor in a plan view of the first planar conductor.

2. The antenna device according to claim 1, further comprising:

a line conductor portion that is connected to two points on an inner edge of the conductor opening; and a capacitor that defines a loop-shaped current path together with the first planar conductor and the line conductor portion; and the coil antenna magnetically couples with the loop-shaped current path.

3. The antenna device according to claim 2, wherein the conductor opening includes a first conductor opening portion and a second conductor opening portion; and the line conductor portion partitions the conductor opening into the first conductor opening portion and the second conductor opening portion.

4. The antenna device according to claim 1, wherein first planar conductor includes a slit that connects the conductor opening and the conductor outer edge to each other.

5. The antenna device according to claim 1, wherein the coil antenna has a helical shape that extends along a square or substantially square cylinder.

6. An electronic appliance comprising:
the antenna device according to claim 1; and
a circuit board including a ground conductor pattern; wherein
the first planar conductor is defined by the ground conductor pattern.

7. The electronic appliance according to claim 6, further comprising:

a line conductor portion that is connected to two points on an inner edge of the conductor opening; and a capacitor that defines a loop-shaped current path together with the first planar conductor and the line conductor portion; and the coil antenna magnetically couples with the loop-shaped current path.

8. The electronic appliance according to claim 7, wherein the conductor opening includes a first conductor opening portion and a second conductor opening portion; and the line conductor portion partitions the conductor opening into the first conductor opening portion and the second conductor opening portion.

9. The electronic appliance according to claim 6, wherein the first planar conductor includes a slit that connects the conductor opening and the conductor outer edge to each other.

10. The electronic appliance according to claim 6, wherein the coil antenna has a helical shape that extends along a square or substantially square cylinder.

11. An electronic appliance comprising:
the antenna device according to claim 1; and
a casing including an electrically conductive portion; wherein
the second planar conductor is defined by the electrically conductive portion of the casing.

12. The electronic appliance according to claim 11, further comprising:

a line conductor portion that is connected to two points on an inner edge of the conductor opening; and a capacitor that defines a loop-shaped current path together with the first planar conductor and the line conductor portion; and the coil antenna magnetically couples with the loop-shaped current path.

13. The electronic appliance according to claim 12, wherein
the conductor opening includes a first conductor opening portion and a second conductor opening portion; and the line conductor portion partitions the conductor opening into the first conductor opening portion and the second conductor opening portion.

14. The electronic appliance according to claim 11, wherein the first planar conductor includes a slit that connects the conductor opening and the conductor outer edge to each other.

15. The electronic appliance according to claim 11, wherein the coil antenna has a helical shape that extends along a square or substantially square cylinder.

16. An electronic appliance comprising:
the antenna device according to claim 1; and
a display panel including a shield layer; wherein
the second planar conductor defines the shield layer.

17. The electronic appliance according to claim 16, further comprising:

a line conductor portion that is connected to two points on an inner edge of the conductor opening; and a capacitor that defines a loop-shaped current path together with the first planar conductor and the line conductor portion; and the coil antenna magnetically couples with the loop-shaped current path.

18. The electronic appliance according to claim 17, wherein
the conductor opening includes a first conductor opening portion and a second conductor opening portion; and the line conductor portion partitions the conductor opening into the first conductor opening portion and the second conductor opening portion.

19. The electronic appliance according to claim 16, wherein the first planar conductor includes a slit that connects the conductor opening and the conductor outer edge to each other.

20. The electronic appliance according to claim 16, wherein the coil antenna has a helical shape that extends along a square or substantially square cylinder.

* * * * *